United States Patent
Kuge et al.

(10) Patent No.: US 8,670,915 B2
(45) Date of Patent: Mar. 11, 2014

(54) VEHICLE DRIVING ASSIST SYSTEM

(71) Applicant: Nissan Motor Co., Ltd., Kanagawa (JP)

(72) Inventors: Nobuyuki Kuge, Zushi (JP); Takayuki Kondoh, Yokohama (JP); Akira Onozuka, Yokosuka (JP); Tomohiro Yamamura, Yokohama (JP); Yoshiharu Kamisuki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/860,064

(22) Filed: Apr. 10, 2013

(65) Prior Publication Data

US 2013/0238211 A1 Sep. 12, 2013

Related U.S. Application Data

(63) Continuation of application No. 11/751,805, filed on May 22, 2007, now Pat. No. 8,442,739.

(30) Foreign Application Priority Data

May 23, 2006 (JP) ................................ 2006-142713

(51) Int. Cl.
G08G 1/16 (2006.01)

(52) U.S. Cl.
USPC .................. 701/96; 701/36; 701/45; 701/48; 701/70; 701/91; 701/300; 701/301; 701/302

(58) Field of Classification Search
None
See application file for complete search history.

(56) References Cited

U.S. PATENT DOCUMENTS

| | | | |
|---|---|---|---|
| 6,542,793 B2 | 4/2003 | Kojima et al. | |
| 6,810,319 B2 | 10/2004 | Manaka | |
| 7,200,481 B2* | 4/2007 | Yamamura et al. | 701/96 |
| 7,715,972 B2* | 5/2010 | Kuge | 701/96 |
| 7,734,419 B2* | 6/2010 | Kondoh | 701/301 |
| 8,000,874 B2* | 8/2011 | Tange et al. | 701/96 |
| 8,121,772 B2* | 2/2012 | Etori | 701/96 |
| 8,359,155 B2* | 1/2013 | Kimura et al. | 701/302 |
| 8,364,345 B2* | 1/2013 | Oida et al. | 701/37 |
| 8,386,119 B2* | 2/2013 | Kobayashi et al. | 701/29.2 |
| 8,447,489 B2* | 5/2013 | Murata et al. | 701/96 |
| 2002/0016659 A1 | 2/2002 | Tashiro et al. | |
| 2003/0163240 A1 | 8/2003 | Egami | |
| 2004/0172185 A1* | 9/2004 | Yamamura et al. | 701/96 |
| 2004/0249549 A1 | 12/2004 | Kondoh et al. | |
| 2005/0033517 A1 | 2/2005 | Kondoh et al. | |

(Continued)

FOREIGN PATENT DOCUMENTS

| | | |
|---|---|---|
| DE | 102004051909 A1 | 4/2006 |
| JP | 2005112242 A | 4/2005 |

Primary Examiner — Jonathan M Dager
(74) Attorney, Agent, or Firm — Global IP Counselors, LLP

(57) ABSTRACT

A vehicle driving assist system is provided that calculates a risk potential indicative of a degree of convergence between the host vehicle and the preceding obstacle. A first driving assistance control system controls at least one of an actuation reaction force exerted by a driver-operated driving operation device and a braking/driving force exerted against the host vehicle based on the risk potential calculated. A second driving assistance control system controls the braking/driving force of the host vehicle such that a headway distance is maintained between the host vehicle and the obstacle. A transition detecting section detects a transition of operating states of the first and second driving assistance control systems. The control adjusting section adjusts the control executed by the first and second driving assistance control systems when a transition of operating state is detected.

3 Claims, 31 Drawing Sheets

(56) References Cited

U.S. PATENT DOCUMENTS

| | | | |
|---|---|---|---|
| 2006/0031015 A1* | 2/2006 | Paradie | 701/301 |
| 2007/0213916 A1* | 9/2007 | Sugano et al. | 701/96 |
| 2007/0255481 A1* | 11/2007 | Egawa et al. | 701/96 |
| 2007/0272464 A1* | 11/2007 | Takae et al. | 180/169 |
| 2007/0276577 A1* | 11/2007 | Kuge et al. | 701/96 |
| 2008/0033625 A1* | 2/2008 | Ohtsuji | 701/93 |
| 2008/0065328 A1* | 3/2008 | Eidehall et al. | 701/301 |
| 2008/0097699 A1* | 4/2008 | Ono | 701/300 |
| 2008/0255746 A1* | 10/2008 | Hellmann et al. | 701/96 |
| 2009/0192710 A1* | 7/2009 | Eidehall et al. | 701/301 |
| 2010/0114490 A1* | 5/2010 | Becker | 701/301 |
| 2012/0203438 A1* | 8/2012 | Breuer et al. | 701/70 |
| 2013/0253792 A1* | 9/2013 | Hammoud et al. | 701/70 |

\* cited by examiner

FOLLOWING DISTANCE CONTROL

| | NOT OPERATING | OPERATING |
|---|---|---|
| RP CONVEYANCE CONTROL — NOT OPERATING | MODE 0 | MODE 2 / MODE 0 DUE TO OVERRIDE |
| RP CONVEYANCE CONTROL — OPERATING | MODE 1 | MODE 3 / MODE 4 DUE TO OVERRIDE |

Fig. 6

(a) LARGE DISTANCE BETWEEN HOST VEHICLE AND PRECEDING VEHICLE (b) SHORT DISTANCE BETWEEN HOST VEHICLE AND PRECEDING VEHICLE

US 8,670,915 B2

VEHICLE DRIVING ASSIST SYSTEM

CROSS-REFERENCE TO RELATED APPLICATIONS

This application is a continuation application of U.S. patent application Ser. No. 11/751,805 filed on May 22, 2007. The entire disclosure of U.S. patent application Ser. No. 11/751,805 is hereby incorporated herein by reference.

This application claims priority to Japanese Patent Application No. 2006-142713 filed 23 May 2006. The entire disclosure of Japanese Patent Application No. 2006-142713 is hereby incorporated herein by reference.

BACKGROUND OF THE INVENTION

1. Field of the Invention

The present invention generally relates to a vehicle driving assist system configured to assist a driver with respect to the operation of a vehicle.

2. Background Information

Various vehicle driving assist systems has been proposed to assist a driver with respect to the operation of a vehicle. An example of a vehicle assist system is disclosed in Japanese Laid-Open Patent Application No. 2000-54860. In this publication, the vehicle driving assist system increases an accelerator pedal reaction force such that the driver can rest his or her foot on the accelerator pedal during automatic cruise control. With such a system, the driver can override the automatic cruise control and accelerate the vehicle by depressing the accelerator pedal during automatic cruise control. Another example of a vehicle assist system is disclosed in Japanese Laid-Open Patent Application No. 2004-17847. In this publication, the vehicle driving assist system executes headway or following distance control and changes the accelerator pedal reaction force in accordance with changes in the traveling situation of the vehicle.

SUMMARY OF THE INVENTION

With the conventional driving assist systems just described, it is difficult for the driver to execute driving operations in accordance with his or her intent when the system is switching between an automatic cruise control or a following distance control and accelerator reaction force control.

In accordance with one aspect of the present invention, a vehicle driving assist system is provided that basically comprises a preceding object detecting section, a risk potential calculating section, a first driving assistance control system, a second driving assistance control system, a transition detecting section and a control adjusting section. The preceding object detecting section is configured to detect a preceding object existing in front of a host vehicle. The risk potential calculating section is configured to calculate a risk potential indicative of a degree of convergence between the host vehicle and the preceding obstacle based on a detection result of the preceding object detecting section. The first driving assistance control system is configured to control at least one of an actuation reaction force exerted by a driver-operated driving operation device and a braking/driving force exerted against the host vehicle based on the risk potential calculated by the risk potential calculating section. The second driving assistance control system is configured to control the braking/driving force of the host vehicle such that a headway distance is maintained between the host vehicle and the obstacle. The transition detecting section is configured to detect a transition of operating states of the first and second driving assistance control systems. The control adjusting section is configured to adjust the control executed by the first and second driving assistance control systems when a transition of operating state is detected by the transition detecting section.

BRIEF DESCRIPTION OF THE DRAWINGS

Referring now to the attached drawings which form a part of this original disclosure:

FIG. 6 is a diagram illustrating the control state transitions of a following distance control and an RP conveyance control;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
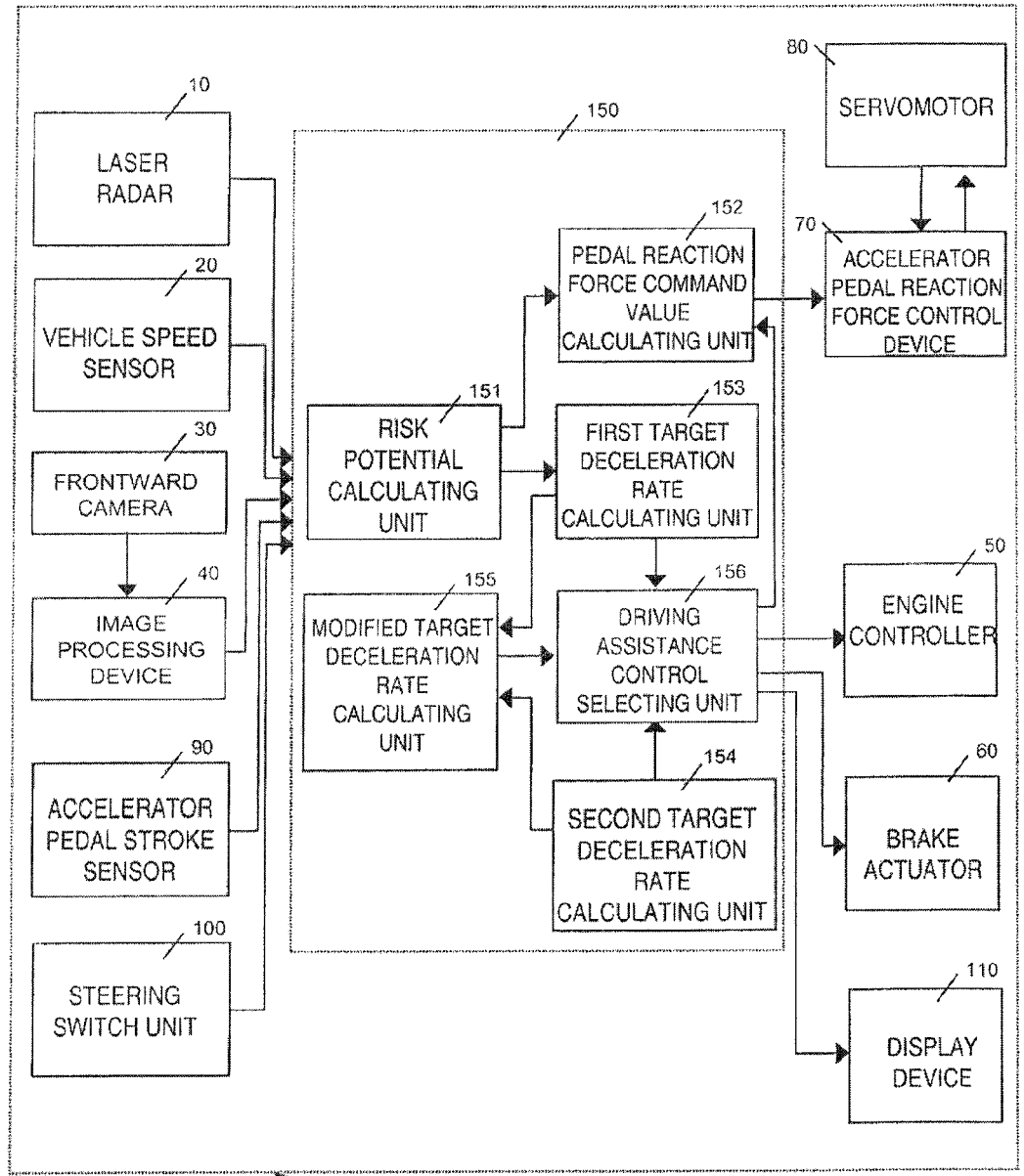
FIG. 1 is an exemplarily system diagram of a vehicle driving assist system in accordance with the present invention.
Figure 2:
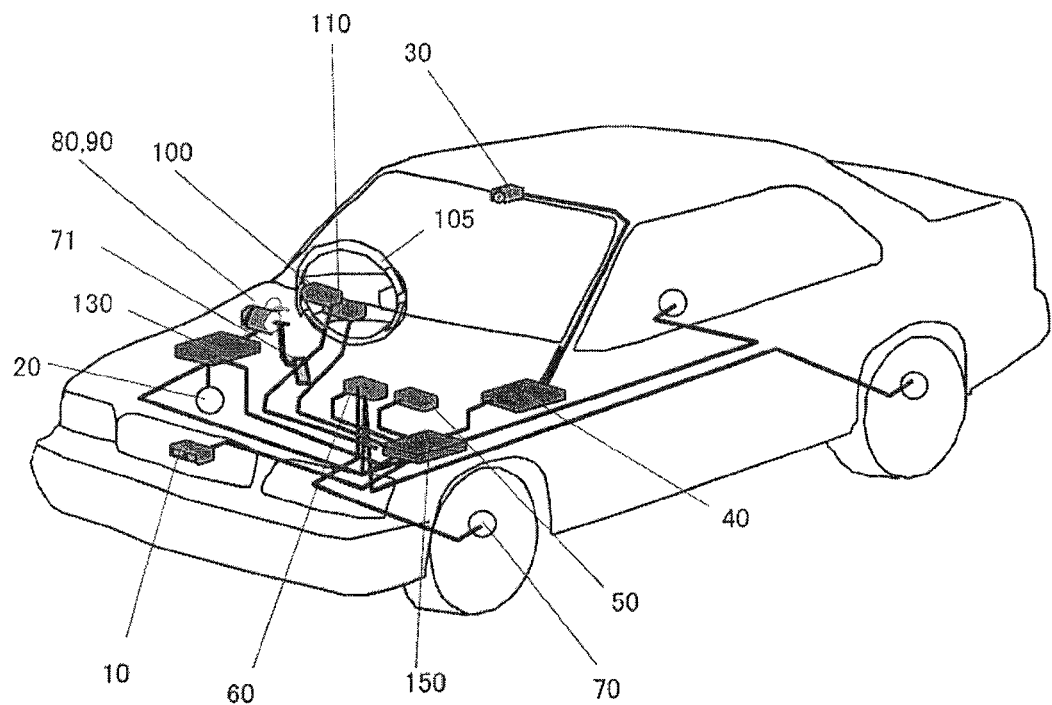
FIG. 2 is a schematic perspective view of a vehicle in which the vehicle driving assist system shown in FIG. 1 is installed in accordance with the present invention.

Referring initially to FIG. 1, an exemplarily system diagram of a vehicle driving assist system is illustrated in accordance with the present invention. FIG. 2 is a schematic perspective view of a vehicle (hereinafter also called "the host vehicle") in which the vehicle driving assist system shown in FIG. 1 is installed in accordance with the present invention. With the present invention, as explained below, it possible to prevent transition between a first driving assistance control system and a second driving assistance control system from impeding a driver's ability to operate a vehicle in accordance with his or her intent by adjusting the controls executed by the vehicle driving assist system in such a manner that a smooth control transition is achieved.

The main structures and features of the vehicle driving assist system will now be explained. In order to detect the running conditions of the host vehicle, the vehicle driving assist system includes, among other things, a laser radar device 10 that serves as a headway distance sensor. The laser radar device 10 is mounted to a front grill portion, a bumper portion, or the like of the host vehicle. The laser radar device 10 horizontally scans a region in front of the host vehicle with an infrared light pulse. The laser radar device 10 then measures the reflected light resulting from the infrared light reflecting off of a plurality of reflecting objects located in front of the host vehicle (normally, the rear ends of preceding vehicles). The region in front of the host vehicle scanned by the laser radar device 10 is, for example, ±6 degrees with respect to the front of the host vehicle and the system detects preceding objects existing within this angular range. By measuring the time required for the reflected light to arrive, the laser radar device 10 detects the headway or following distance with respect to the preceding vehicle(s) or other obstacle(s). The detected headway distances and relative velocities are sent to a controller 150.

The vehicle speed sensor 20 detects the speed of the host vehicle in which the system 1 is installed by measuring the rotational speed of the wheels or the rotational speed of the output side of the transmission. The vehicle speed sensor 20 outputs the detected vehicle speed to the controller 150.

Figure 3:
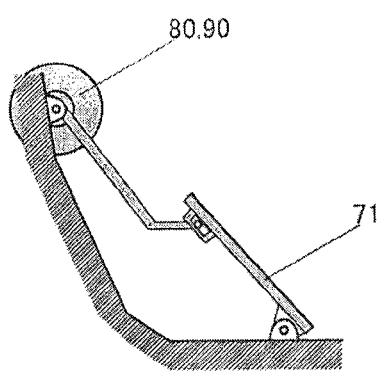
FIG. 3 is a schematic side elevational view of the vicinity of an accelerator pedal of the vehicle illustrated in FIG. 2.

A frontward camera 30 comprising, for example, a small CCD camera or CMOS camera mounted on an upper portion of the front windshield serves to capture an image of the circumstances of a region of road in front of the host vehicle. The frontward camera 30 sends a signal of the captured image an image processing device 40, which processes the image and sends the image to the controller 150. The detection region of the frontward camera 30 is a region within ±30 degrees horizontally with respect to the longitudinal centerline of the host vehicle. The frontward camera 30 captures an image of the forward road situation within this detection region As shown in FIG. 3, a servomotor 80 and an accelerator pedal stroke sensor 90 are connected to an accelerator pedal 71 through a link mechanism. The accelerator pedal stroke sensor 90 detects the stroke amount (actuation amount) Ap of the accelerator pedal 71 as a rotational angle of the servomotor 80; depression of the accelerator pedal 71 is converted into a rotational angle of the servomotor 80 by the linkage mechanism.

A steering switch unit 100 is installed, for example, on a steering wheel 105 such that it is easy for a driver to operate. The steering switch unit 100 includes hand-operated switches for turning on and off a following distance control and a risk potential conveyance control (both described later). The steering switch unit 100 also includes hand-operated switches for setting a target time to headway for use during the following distance control. When a driver operates any of the switches, a signal corresponding to the switch operation is sent from the steering switch unit 100 to the controller 150.

The controller 150 comprises a CPU and a ROM, a RAM, and other components peripheral to the CPU and serves to control the entire vehicle driving assist system 1. The controller 150 comprises the following units provided, for example, in a CPU software format: a risk potential calculating unit 151, a pedal reaction force command value calculating unit 152, a first target deceleration rate calculating unit 153, a second target deceleration rate calculating unit 154, a modified target deceleration rate calculating unit 155, and a driving assistance control selecting unit 156.

The risk potential calculating unit 151 calculates a risk potential RP indicating the degree of convergence of the host vehicle with respect to an obstacle existing in front of the host vehicle. The risk potential RP is calculated based on the vehicle speed detected by the vehicle speed sensor 20, the relative velocity and the headway distance between the host vehicle and the obstacle in front of the host vehicle detected by the laser radar 10, and the image data of the vicinity of the host vehicle outputted from the image processing device 40. Based on the risk potential RP calculated by the risk potential calculating unit 151, the pedal reaction force calculating unit 152 calculates a command value FA for the actuation reaction force to be exerted by the accelerator pedal 71. The first target deceleration rate calculating unit 153 serves to calculate a target deceleration rate to be imposed on the host vehicle during risk potential conveyance control (hereinafter called "RP conveyance control"); the calculation is based on the risk potential RP. In this embodiment, the risk potential is conveyed to the driver by controlling the braking/driving force exerted against the host vehicle.

The second target deceleration rate calculating unit 154 serves to calculate a target deceleration rate to be used during the following distance control. The following distance control is contrived to control the headway distance and the vehicle speed such that the host vehicle maintains a certain relative running condition with respect to a preceding obstacle. In other words, the following distance control controls the acceleration and deceleration of the host vehicle such that the headway distance between the host vehicle and a preceding vehicle is held substantially constant while also imposing a preset vehicle speed as an upper limit of the vehicle speed. The second target deceleration rate calculating unit 154 calculates the target deceleration rate for following the preceding vehicle based on a target time to headway input from the steering switch unit 100.

The modified target deceleration rate calculating unit 155 serves to calculate a modified target deceleration rate for use when there is a transition in the operating states of the RP conveyance control and the following distance control. The calculation is based on the target deceleration rate calculated by the first target deceleration rate calculating unit 153 and the target deceleration rate calculated by the second target deceleration rate calculating unit 154. The driving assistance control selecting unit 156 selects an operating state for each of the RP conveyance control and the following distance control based on the target deceleration rates and the modified target deceleration rate and outputs operation commands to an engine controller 50, a brake actuator 60, and a display device 110.

An accelerator pedal reaction force control device 70 controls the actuation reaction force exerted by the accelerator pedal 71 based on a command value received from the controller 150. The servomotor 80 controls the actuation reaction force generated when the driver operates the accelerator pedal 71 by controlling its torque and rotational angle based on a command value from the accelerator pedal reaction force control device 70. The normal reaction force characteristic exhibited by the accelerator pedal 71 when the accelerator pedal reaction force control is not executed is set such that, for example, the accelerator pedal reaction force increases linearly as the accelerator pedal actuation amount Ap increases. The normal accelerator pedal reaction force characteristic can be realized by utilizing the spring force of a torsion spring (not shown) provided at the rotational center of the accelerator pedal 71.

Figure 4:
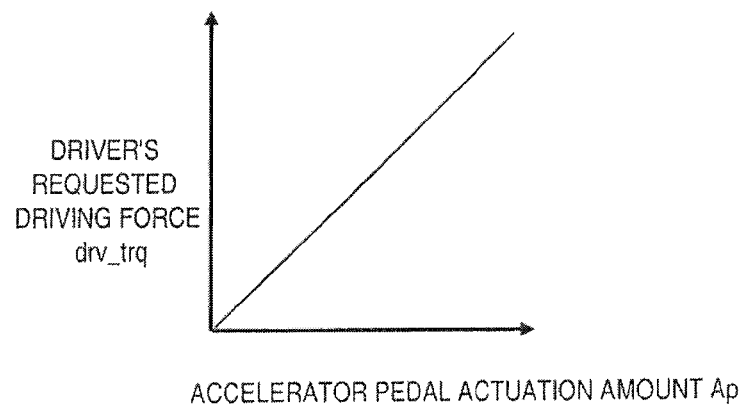
FIG. 4 is a graph plotting the driver's requested driving force versus the accelerator pedal depression amount.

The engine controller 50 calculates a control command to be sent to the engine and serves as a driving force control means for controlling the driving force exerted against the host vehicle. The engine controller 50 controls the driving force in such a manner as to achieve the target deceleration rate received from the controller 150. More specifically, the engine controller 50 uses a relationship like that shown in FIG. 4 to calculate the driver's requested driving force drv_trq based on the accelerator pedal actuation amount SA. Then, the engine controller 50 calculates the control command to be sent to the engine by subtracting a value equivalent to the target deceleration rate from the driver's requested driving force drv_trq. During the following distance control, the acceleration of the host vehicle is controlled in such a manner as to achieve the set target time to headway while ignoring accelerator pedal actuation amount SA.

The brake actuator 60 serves as a braking force control section that controls a braking force exerted against the host vehicle by outputting a brake fluid pressure command. The brake actuator 60 controls the braking force in such a manner as to achieve the target deceleration rate received from the controller 150. Brake devices provided on the wheels of the host vehicle operate in accordance with the command issued from the braking actuator 60.

Figure 5:
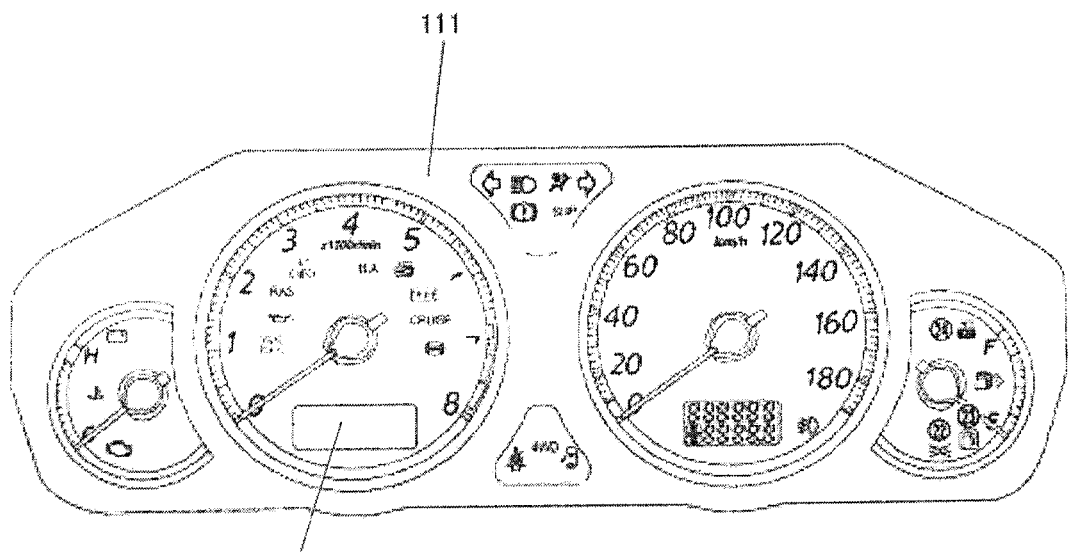
FIG. 5 is an elevational view of a display device of the vehicle with a meter.

The display device 110 is, for example, a dot matrix display. As shown in FIG. 5, the display device 110 is arranged in a portion of a combination meter 111 provided in the instrument panel in front of the driver's seat so as to be readily viewable by the driver. The display device 110 serves to display the operating state of the currently executed control in accordance with a command from the controller 150.

The operation of a vehicle driving assist system 1 in accordance with the first embodiment will now be explained. First, an overview of the operation will be provided.

The controller 150 calculates the risk potential RP of the host vehicle with respect to an obstacle in the vicinity of the host vehicle based on the running condition of the host vehicle and the traveling environment (traveling situation) surrounding the host vehicle detected by the laser radar 10, the vehicle speed sensor 20, and the frontward camera 30. The term "risk potential RP" refers to the degree of risk or possibility of danger. In this embodiment, the risk potential is contrived to increase as the host vehicle and an obstacle existing in the vicinity of the host vehicle approaches each other. Thus, it can be the that the risk potential is a physical quantity that expresses how close the host vehicle and the obstacle are to each other, i.e., the degree to which the host vehicle and the obstacle have drawn near to each other (degree of convergence).

The controller 150 controls the actuation reaction force exerted by the accelerator pedal 71 based on the risk potential RP and convey the risk potential RP to the driver by causing the host vehicle to decelerate, thereby alerting the driver (RP conveyance control). The controller 150 is also configured to control the acceleration/deceleration of the host vehicle based on a target time to headway set by the driver such that a substantially constant distance is maintained between the host vehicle and a preceding vehicle (following distance control).

Thus, the controller 150 can execute a plurality of different controls that control the deceleration of the host vehicle. The RP conveyance control and the following distance control are turned "on" and "off" by operating respective switches of the steering switch unit 100. FIG. 6 shows the operating modes of the RP conveyance control and the following distance control. A state in which the RP conveyance control and the following distance control are both not operating (OFF) is called Mode 0 and a state in which the RP conveyance control is operating (ON) and the following distance control is not operating is called Mode 1.

A state in which the RP conveyance control is not operating and the following distance control is operating is called Mode 2. If the driver depresses the accelerator pedal 71 while the vehicle driving assist system 1 is in Mode 2, the following distance control is overridden and the vehicle driving assist system 1 shifts to Mode 0, in which neither the following distance control nor the RP conveyance control is operating. When the accelerator pedal 71 is released, the override state (state in which following distance control is overridden) is cancelled and the mode returns to Mode 2.

A state in which both the RP conveyance control and the following distance control are operating is called Mode 3. In Mode 3, operation of the following distance control is given priority over operation of the RP conveyance control. In other words, Mode 3 is a state in which both controls can operate, but only the following distance control is actually operating. If the driver depresses the accelerator pedal 71 while the vehicle driving assist system 1 is in Mode 3, then the following distance control is overridden and the vehicle driving assist system 1 shifts to Mode 4, in which only the RP conveyance control is operating. When the accelerator pedal 71 is released, the override state is cancelled and the mode returns to Mode 3.

Thus, when the mode shifts from Mode 3 (in which both RP conveyance control and following distance control can be executed) to Mode 4, the control that is actually executed is switched from the following distance control to the RP conveyance control. When the system switches from following distance control to RP conveyance control in this manner, there is a possibility that the deceleration rate imposed on the host vehicle will be increase due to the difference between the target deceleration rate set during the following distance control and the new target deceleration rate set for the RP conveyance control. In such a case, the behavior of the host vehicle may deviate greatly from the driver's intent because the driver is depressing the accelerator pedal 71 and attempting to accelerate. When the override state is cancelled and the mode returns from Mode 4 to Mode 3, there is a possibility that the deceleration rate will decrease in comparison with the deceleration rate imposed during RP conveyance control.

Therefore, in the first embodiment, a control modification is executed when the vehicle driving assist system 1 switches between the following distance control and the RP conveyance control in order to prevent the vehicle behavior from being contrary to the intent of the driver.

Figure 7:
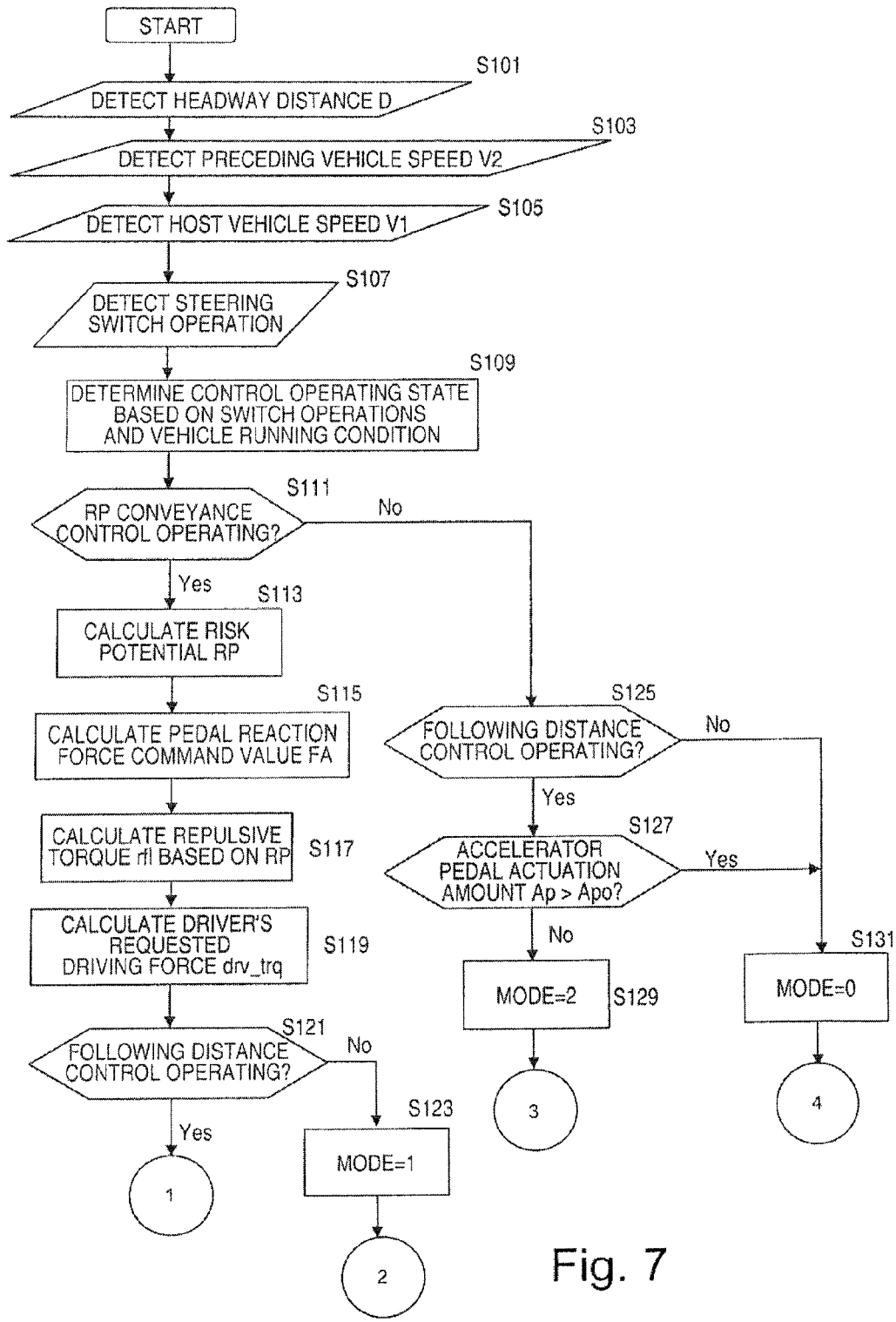
FIG. 7 is a flowchart showing the processing steps of a vehicle driving assistance control program in accordance with the first embodiment.
Figure 8:
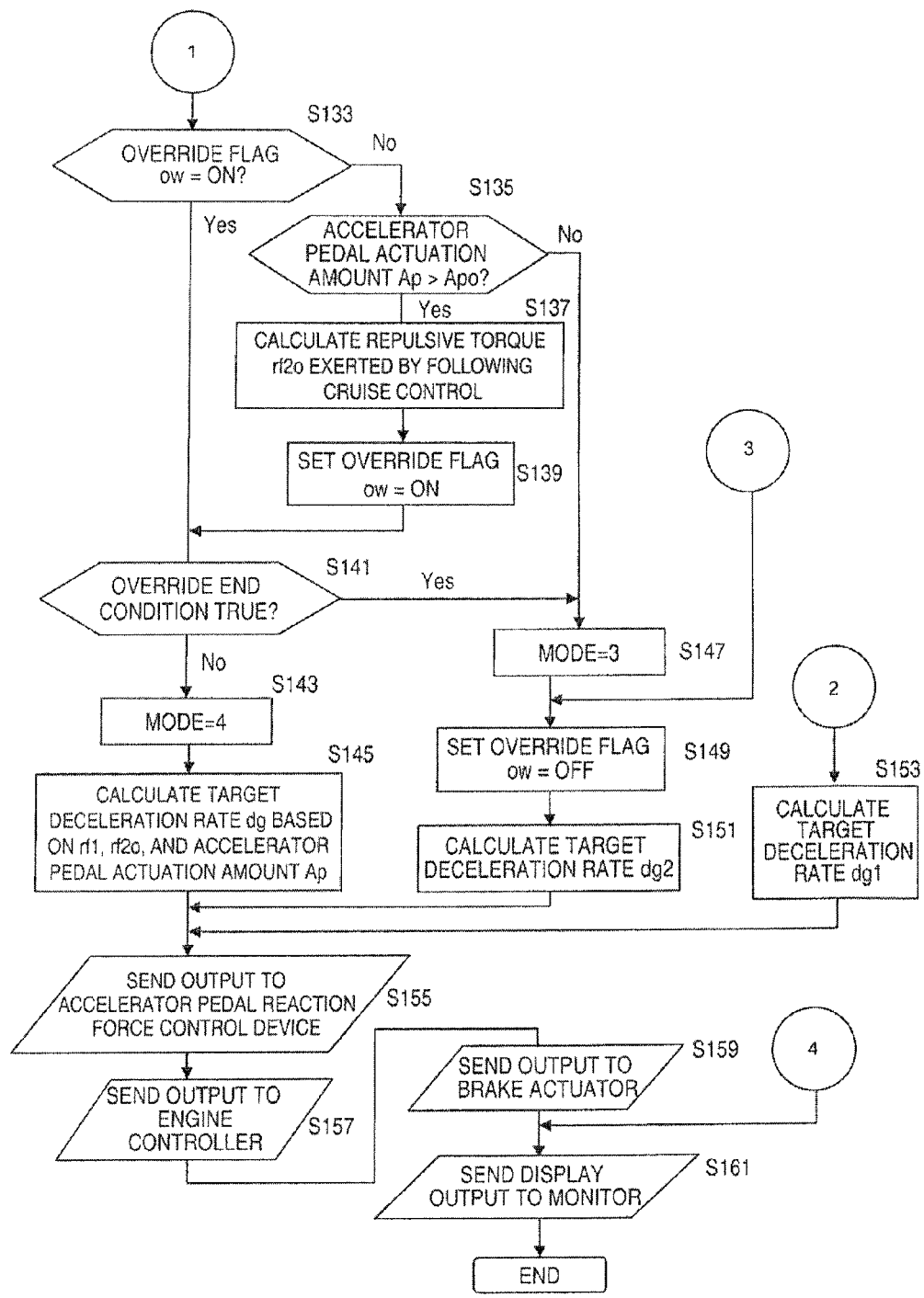
FIG. 8 is a flowchart showing the continuation of the processing steps of the vehicle driving assistance control program shown in FIG. 7.

The operation of the vehicle driving assist system 1 in accordance with the first embodiment will now be explained in more detail with reference to FIGS. 7 and 8. FIGS. 7 and 8 show a flowchart of the processing steps of a driving assistance control program executed by the controller 150. This control loop is executed continuously once per prescribed time period, e.g., every 50 msec.

In step S101, the controller 150 detects an obstacle existing in front of the vehicle and the headway distance D between the vehicle and the preceding obstacle based on signals from the laser radar 10 and the image processing device 40. Here, it is assumed, for example, that the preceding obstacle is a preceding vehicle. In step S103, the controller 150 detects the preceding vehicle speed V2 of the preceding vehicle detected in step S101. The preceding vehicle speed V2 can be detected using, for example, intervehicle communication or a calculation based on input signals from the laser radar 10 and image processing device 40. In step S105, the controller 150 detects the host vehicle speed V1 via the vehicle speed sensor 20.

In step S107, the controller 150 reads an operation signal from the steering switch unit 100. In step S109, the controller 150 determines the current operating states of the RP conveyance control and following distance control based on the running condition and traveling environment of the vehicle read in steps S101 to S105 and the operation signal of the steering switch unit 100 read in step S107. In short, the controller 150 determines if each of the RP conveyance control and the following distance control is operating or not operating.

In step S111, the controller 150 determines if the RP conveyance control is operating. If RP conveyance control is operating, the controller 150 proceeds to step S113. If not, the controller 150 proceeds to step S125. In step S113, the risk potential RP of the vehicle with respect to the preceding object is calculated based on the running condition and the traveling environment of the vehicle detected in steps S101 to S105. The method of calculating the risk potential RP will now be described.

Figure 9:
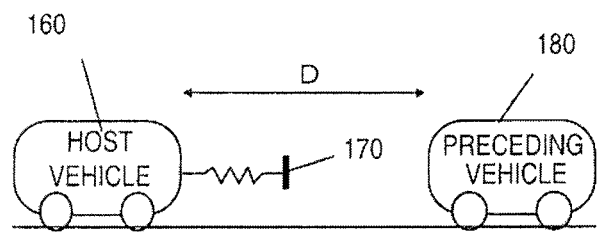
FIG. 9 is a pair of diagrams (a) and (b) showing a method of calculating the risk potential.
Figure 9:
Figure 10:
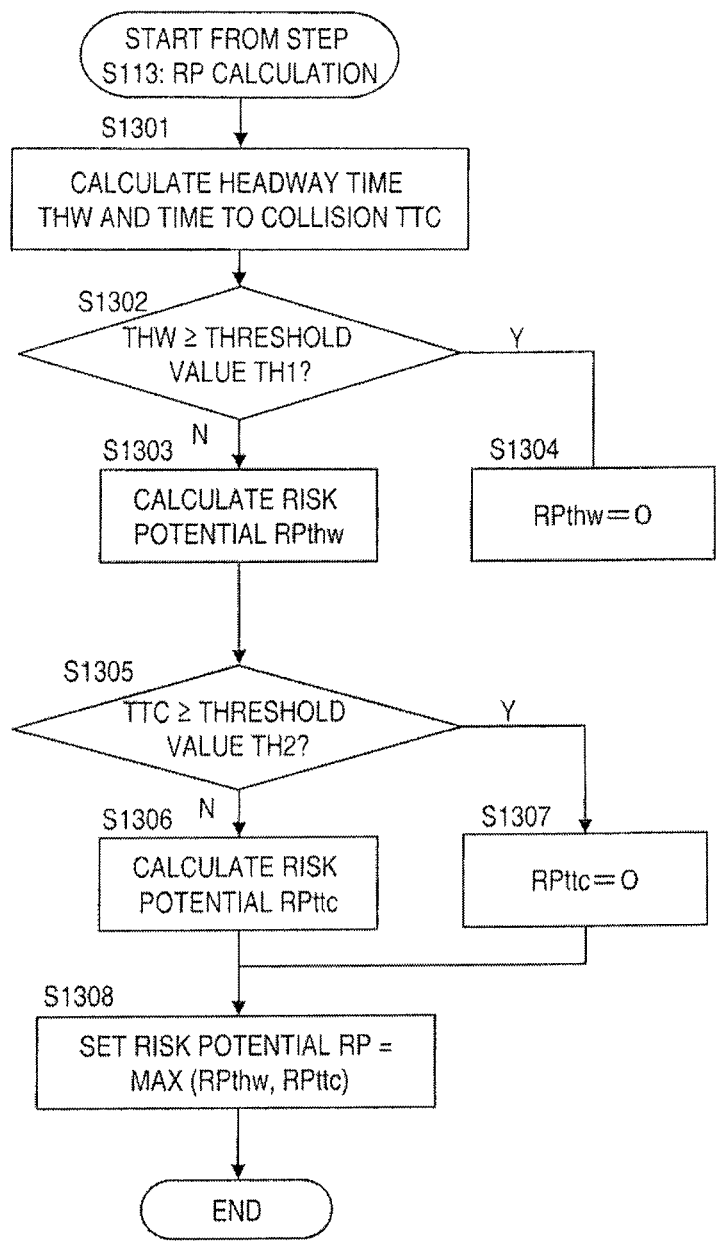
FIG. 10 is a flowchart for showing the processing steps executed in order to calculate the risk potential.

Consider a model in which it is assumed that an imaginary elastic body 170 is provided on the front of the vehicle 160 in which the driving assistance system 1 is installed, as shown in diagram (a) of FIG. 9. The imaginary elastic body 170 touches against the preceding vehicle 180 and is compressed, thereby generating a pseudo traveling resistance against the movement of the vehicle 160. The risk potential RP with respect to the obstacle is defined to be the repulsive force that results when, as shown in diagram (b) of FIG. 9, the imaginary elastic body 170 contacts the preceding vehicle 180 and is compressed. In this embodiment, the repulsive force of an imaginary elastic body correlated to the time to collision TTC between the vehicle and the preceding obstacle and the repulsive force of an imaginary elastic body correlated to the time to headway THW between the vehicle and the preceding obstacle are both calculated and the larger of the two calculated repulsive forces is selected in order to determine the risk potential RP. The method of calculating the risk potential RP will now be explained with reference to the flowchart of FIG. 10.

In step S1301, the controller 150 calculates the time to headway THW and the time to collision TTC between the vehicle and the preceding obstacle. The time to headway THW is a physical quantity indicating the time required for the vehicle to reach the current position of the preceding object, e.g., preceding vehicle, and is calculated using Equation 1 below based on the host vehicle speed V1 and the headway distance D.

$$THW = D/V1 \qquad \text{(Equation 1)}$$

The time to collision TTC is a physical quantity indicating the current degree of convergence of the vehicle with respect to the preceding vehicle. More specifically, the time to collision TTC is a value indicating the number of seconds until the headway distance D becomes zero and the vehicle contacts the preceding vehicle if the current runnning condition continues, i.e., if the host vehicle speed V1 and the relative velocity Vr remain constant. The relative velocity Vr (i.e., V1=V1−V2) is treated as zero (Vr=0) when the traveling speed of the preceding vehicle is larger than the traveling speed of the vehicle. The time to collision TTC with respect to the preceding obstacle is found using the Equation 2 shown below.

$$TTC=D/Vr \qquad \text{(Equation 2)}$$

The smaller the time to collision TTC is, the more eminent the contact with the preceding vehicle is and the larger the degree of convergence with respect to the preceding vehicle is. For example, it is known that when approaching a preceding vehicle, most drivers start taking action to decelerate before the time to collision TTC reaches 4 seconds or less.

In step S1302, the controller 150 compares the time to headway THW to a threshold value TH1. The threshold value TH1 is set to an appropriate time to headway value (e.g., 2 seconds) for determining that it is time for control to be started. If the time to headway THW is smaller than the threshold value TH1 (THW<TH1), the controller 150 proceeds to step S1303. In step S1303, the controller 150 calculates a risk potential RPthw based on the time to headway THW by using the host vehicle speed V1 and the time to headway THW in the Equation 3 shown below.

$$RP_{thw}=K\_THW \times (TH1-THW) \times V1 \qquad \text{(Equation 3)}$$

In Equation 3, the term K_THW is a spring constant of the imaginary elastic body correlated to the time to headway THW and the value of TH1×V1 corresponds to the length of the imaginary elastic body.

If the time to headway THW is found to be equal to or larger than threshold value TH1 (THW≥TH_THW) in step S1302, the controller 150 proceeds to step S1304 and sets the value of the risk potential RPthw to 0.

In step S1305, the controller 150 compares the time to collision TTC to a threshold value TH2. The threshold value TH2 is set to an appropriate time to collision value (e.g., 8 seconds) for determining that it is time for control to be started. If the time to collision TTC is smaller than the threshold value TH2 (TCC<TH2), then the controller 150 proceeds to step S1306. In step S1306, the controller 150 calculates a risk potential RPttc based on the time to collision TTC by using the relative velocity Vr and the time to collision TTC in the Equation 4 shown below.

$$RP_{ttc}=K\_TTC \times (TH2-TTC) \times Vr \qquad \text{(Equation 4)}$$

In Equation 4, the term K_TTC is the spring constant of the imaginary elastic body correlated to the time to collision TTC and the value of TH2×Vr corresponds to the length of the imaginary elastic body.

If the time to collision TTC is found to be equal to or larger than TH2 (TTC≥TH2) in step S1305, then the controller 150 proceeds to step S1307 and sets the value of the risk potential RPttc to 0.

In step S1308, the controller 150 compares the risk potential RPthw calculated based on the time to headway THW in step S1303 or S1304 to the risk potential RPtcc calculated based on the time to collision TTC in step S1306 or S1307 and selects the larger of the two values to be used as the final risk potential RP.

After it calculates the risk potential RP in step S113, the controller 150 proceeds to step S115. In step S115, the controller 150 calculates an accelerator pedal reaction force command value FA based on the risk potential RP calculated in step S113.

Figure 11:
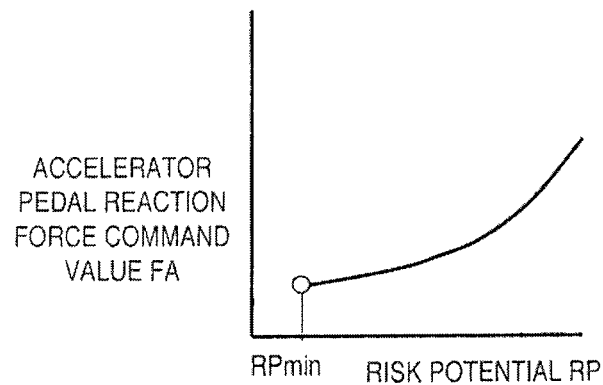
FIG. 11 is a graph plotting the reaction force command value versus the risk potential.

FIG. 11 is a graph plotting the reaction force command value FA versus the risk potential RP. As shown in FIG. 11, the reaction force command value FA is set to 0 when the risk potential RP is equal to or smaller than a minimum value RPmin. This is done to prevent increases in the actuation reaction force of the accelerator pedal 71 from occurring when the risk potential RP in the vicinity of the vehicle is extremely small and, thus, becoming an annoyance to the driver. The minimum value RP is set in advance to an appropriate value.

In the region where the risk potential RP exceeds the minimum value RPmin, the reaction force command value FA increases exponentially with respect to the risk potential RP. The reaction force command value FA is found using the Equation 5 shown below.

$$FA=\alpha \times RP^n \qquad \text{(Equation 5)}$$

The constants $\alpha$ and n vary depending on the vehicle type and are set in advance based on the results of driving simulations or practical experiments to appropriate values for effectively converting the risk potential RP into a reaction force command value FA.

Figure 12:
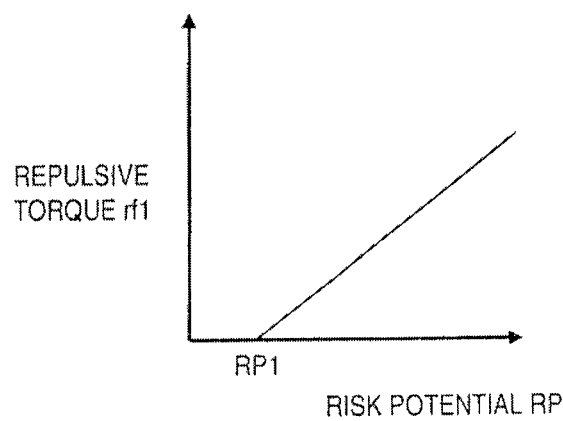
FIG. 12 is a graph plotting the repulsive torque exerted during the RP conveyance control versus the risk potential.

In step S117, the controller 150 calculates a repulsive torque rf1 to be exerted against the vehicle during RP conveyance control based on the risk potential RP calculated in step S113. The repulsive torque rf1 corresponds to the repulsive force exerted against the vehicle 160 by the imaginary elastic body 170 shown in diagrams (a) and (b) in FIG. 9 and serves as a braking/driving force modification amount for lowering the driving force of the vehicle or increasing the braking force of the vehicle during RP conveyance control. FIG. 12 is a graph plotting the repulsive torque rf1 versus the risk potential RP. As shown in FIG. 12, the repulsive torque rf1 increases gradually as the risk potential RP increases beyond a prescribed value RP1.

In step S119, the controller 150 reads the accelerator pedal actuation amount Ap detected by the accelerator pedal stroke sensor 90 and calculates a driver's requested driving force drv_trq based on the accelerator pedal actuation amount Ap. The controller 150, similarly to the engine controller 50, stores a map of the driver's requested driving force drv_trq versus the accelerator pedal actuation amount Ap like that shown in FIG. 4 and calculates the driver's requested driving force drv_trq corresponding to the accelerator pedal actuation amount Ap based on the map.

In step S121, the controller 150 determines if the following distance control is operating. If the following distance control is operating, then the controller 150 proceeds to step S133 of FIG. 8. If not, the controller 150 proceeds to step S123. In a step S133, the controller 150 determines if an override flag ow serving to indicate whether or not the override state exists is on. If the override flag ow is on, then the following distance control is already overridden and the controller 150 proceeds to step S141. If the override flag ow is off, then the controller 150 proceeds to step S135. In step S135, the controller 150 determines if the accelerator pedal actuation amount Ap is larger than a prescribed value Apo. The prescribed value Apo is set to an accelerator pedal actuation amount Ap substantially equivalent to a target vehicle speed with which the target time to headway of the following distance control can be achieved.

As previously explained, the following distance control is given priority when both the RP conveyance control and the following distance control are operating, but the following distance control is overridden and the system switches to RP conveyance control when the condition Ap>Apo occurs. If the condition Ap>Apo exists, then the controller 150 proceeds to step S137. If the condition Ap≤Apo exists, then the controller 150 proceeds to step S147. In step S137, the controller 150 calculates the repulsive torque rf2o exerted by the following distance control at the time when overriding started. The "time when overriding started" refers to the point in time when following distance control was overridden due to the accelerator pedal 71 exceeding the prescribed value Apo. The repulsive torque rf2o serves as a braking/driving force modification amount used to modify the driving force or the braking force in order to achieve the target time to headway during following distance control. The repulsive torque rf2o exerted by the following distance control at the time when overriding started is calculated using the Equation 6 below.

$$rf2o = 1/K2 \times dg2o \quad \text{(Equation 6)}$$

In Equation 6, dg2o is the target deceleration rate imposed by the following distance control at the time when overriding started and K2 is a coefficient for converting the repulsive torque into a target deceleration rate. Here, the inverse of the coefficient K2 is used to convert the target deceleration rate dg2o into the repulsive torque rf2o. The target deceleration rate dg2o of the following distance control is calculated using a well-known method in such a manner as to achieve the aforementioned target headway distance. In step S139, the controller 150 changes the override flag ow to the ON state (turns it on) and proceeds to step S141.

In step S141, the controller 150 determines if a condition for canceling the braking/driving force modification control executed during the override state is satisfied. Examples of conditions for canceling the braking/driving force modification control during the override state are listed below.

Condition 1→The preceding vehicle that was detected at the time when overriding started is no longer detected.

Condition 2→A prescribed amount of time T has elapsed since overriding started.

Condition 3→The repulsive torque rf1 exerted by the RP conveyance control during the override state becomes smaller than the repulsive torque rf2o exerted by the following distance control.

If none of the conditions 1 to 3 listed above is satisfied, then the controller 150 determines that braking/driving force control will be executed during the override state and proceeds to step S143. If any one of the conditions 1 to 3 is satisfied, then the controller 150 proceeds to step S147. In step S143, the controller 150 sets the vehicle traveling assistance system 1 into Mode 4, in which the following distance control is overridden and only the RP conveyance control is executed.

In step S145, the controller 150 calculates a target deceleration rate dg to be used while the following distance control is overridden and only RP conveyance control is executed. First, the controller 150 compares the repulsive torque rf1 of the RP conveyance control calculated in step S117 to the repulsive torque rf2o of the following distance control at the time when overriding started (calculated in step S137). The controller 150 then calculates a modified braking/driving force rfc by subtracting the driver's requested driving force drv_trq from the smaller of the repulsive torques rf1 and rf2o, as shown in Equation 7 below.

$$rfc = \min\{rf1, rf2o\} - drv\_trq \quad \text{(Equation 7)}$$

The target deceleration rate dg can be calculated by multiplying the modified braking/driving force rfc by the coefficient K2, as shown in FIG. 8.

$$dg = K2 \times rfc \quad \text{(Equation 8)}$$

The controller proceeds from step S135 to step S147 if it determines in step S135 that the actuation amount Ap is equal to or smaller than the prescribed value Apo (Ap≤Apo) and from step S141 to step S147 if it determines in step S141 that one of the conditions for cancelling the braking/driving force modification control executed during the override state is satisfied. In step S147, the controller 150 sets the vehicle driving assist system 1 to Mode 3, in which execution of following distance control is given priority over execution of RP conveyance control. In step S149, the controller 150 turns the override flag ow off In step S151, the controller 150 calculates a target acceleration/deceleration rate dg2 for following distance control. Similarly to the target deceleration rate dg2o corresponding to when overriding started, the target acceleration/deceleration rate dg2 is calculated using a well-known method and calculated such that the set target headway distance can be achieved.

If it determines in step S111 that RP conveyance control is not operating, then the controller 150 proceeds to step S125 and determines if following distance control is operating. If following distance control is operating, then the controller 150 proceeds to step S127. If not, then the controller 150 proceeds to step S131. In step S127, the controller 150 determines if the accelerator pedal actuation amount Ap is larger than a prescribed value Apo. If the condition Ap≤Apo exists, then the controller 150 proceeds to step S129. If the condition Ap>Apo exists, the controller 150 proceeds to step S131.

In step S129, the controller 150 sets the vehicle driving assist system to Mode 2, in which only following distance control is executed. In step S131, the controller 150 sets the vehicle driving assist system to Mode 0, in which the following distance control is overridden and neither following distance control nor RP conveyance control is executed. If it sets Mode 0, then the controller 150 proceeds to step S161 (explained later) without calculating a target deceleration rate (target acceleration/deceleration rate).

If it goes to step S129 and sets Mode 2, then the controller 150 proceeds to step S149 and sets the override flag ow to OFF. Then, in step S151, the controller 150 calculates a target acceleration/deceleration rate dg2 for following distance control. Meanwhile, if it determines in step S121 that following distance control is operating, then the controller 150 proceeds to step S123. In step S123, the controller 123 sets the vehicle driving assist system 1 to Mode 1, in which only RP conveyance control is executed. Then the controller 150 proceeds to step S153 and calculates a target deceleration rate dg1 for the RP conveyance control. The target deceleration rate dg1 is calculated using the repulsive torque rf1 calculated in step S117 in the Equation 9 shown below.

$$dg1 = K2 \times rf1 \quad \text{(Equation 9)}$$

After calculating the target deceleration rate (target acceleration/deceleration rate) for Mode 1, 2, or 3, the controller 150 proceeds to step S155. In step S155, the controller 150 sends the accelerator pedal reaction force command value FA calculated in step S115 to the accelerator pedal reaction force control device 70. The accelerator pedal reaction force control device 70 controls the servomotor 80 based on the command from the controller 150 and thereby controls the actuation reaction force that acts when the driver operates the accelerator pedal 71.

In step S157, the controller 150 sends the target deceleration rate dg or dg1 or the target acceleration/deceleration rate dg2 calculated in step S145, S151, or S153 to the engine controller 50. The engine controller 50 compares the target deceleration rate (target acceleration/deceleration rate) to the driver's requested driving force drv_trq determined based on the accelerator pedal actuation amount Ap and modifies the driver's requested driving force drv_trq to a smaller value suitable for achieving the target deceleration rate (target acceleration/deceleration rate). The modified driver's requested driving force value is outputted as an engine control command. Thus, the driving force exerted against the vehicle is reduced. If the driving force reduction amount corresponding to the target deceleration rate (acceleration/deceleration rate) is larger than the driver's requested driving force drv_trq, in step S159 the controller 150 executes a braking force control serving to increase the braking force.

In step S159, the controller 150 sends the target deceleration rate dg or dg1 or the target acceleration/deceleration rate dg2 calculated in step S145, S151, or S153 to the brake actuator 60. Braking force control is executed when the driving force reduction amount corresponding to the target deceleration rate (target acceleration/deceleration rate) is larger than the driver's requested driving force drv_trq and the target deceleration rate (target acceleration/deceleration rate) cannot be achieved with driving force control alone. More specifically, in order to compensate for the amount by which the deceleration achieved with driving force control does not satisfy the target deceleration rate (target acceleration/deceleration rate), the controller 150 issues a brake fluid pressure command contrived to modify a driver's requested braking force based on the brake pedal actuation amount to a larger value. As a result, the braking force exerted against the vehicle is increased. Thus, by reducing the driving force acting against the vehicle and increasing the braking force acting against the vehicle, the overall state of the vehicle is controlled such that the target deceleration rate (target acceleration/deceleration rate) is achieved.

Figure 13:
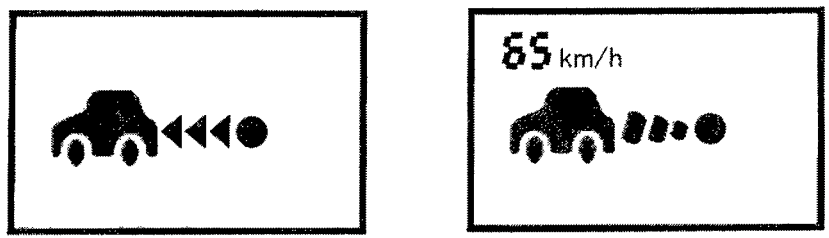
FIG. 13 is a pair of diagrams (a) and (b) showing examples of what is displayed during the RP conveyance control and the following distance control.

In step S161, the controller 150 sends a signal to the display device 110 instructing the display device to indicate the operating states of the RP conveyance control and the following distance control. Diagrams (a) and (b) of FIGS. 13(a) and (b) show examples of what is displayed on the display device 110 to indicate the operating state of the vehicle driving assist system 1. Diagram (a) of FIG. 13 shows an example of what is displayed during Mode 1 or Mode 4 when RP conveyance control is operating. Diagram (b) of FIG. 13 shows an example of what is displayed during Mode 2 or Mode 3 when following distance control is operating. If a target vehicle speed is set for following distance control, the target vehicle speed is also displayed. After the display signal is sent, the current cycle of the control loop ends.

The first embodiment described heretofore can thus provide the following operational effects.

(1) The vehicle driving assist system 1 detects an obstacle existing in front of the vehicle in which the system 1 is installed and calculate a risk potential RP of the vehicle with respect to the obstacle based on the obstacle detection results. Then, based on the calculated risk potential RP, the system 1 executes an RP conveyance control contrived to control the actuation reaction force exerted by a driver-operated driving operation device and/or a braking/driving force exerted against the vehicle and a following distance control contrived to control the braking/driving force of the vehicle such that a headway distance D is maintained between the vehicle and the obstacle. The vehicle driving assist system 1 detects transitions of the operating states of the RP conveyance control and the following distance control and adjusts the controls when it detects a transition of operation state. By adjusting the control when the operating state of one or both of the two different controls changes, the control transition can be accomplished smoothly without impeding the driver's ability to drive (operate) the vehicle in accordance with his or her intent.

(2) The following distance control is given priority when the vehicle driving assist system 1 is in a state in which both the RP conveyance control and the following distance control can operate. Mode 3 (shown in FIG. 6) corresponds to the state in which both controls can operate but following distance control is given priority. By executing following distance control, the driving operations performed by the driver can be assisted and the burden born by the driver can be lightened.

(3) When following distance control is overridden, RP conveyance control is executed. The transition from Mode 3 to Mode 4 (shown in FIG. 6) corresponds a situation in which following distance control is overridden. Since the control to which priority is given, i.e., either RP conveyance control or following distance control, changes based on such factors as the running condition of the vehicle and operations performed by the driver, the control can be optimized to the conditions existing at a particular time.

(4) The controller 150 detects transitions in the operating states of the RP conveyance control and following distance control based on the states of switches operated by the driver. As a result, a control corresponding to the intent of the driver can be executed.

(5) In addition to detecting transitions based on switch operations, the controller 150 detects transitions in the operating states of the RP conveyance control and following distance control based on the actuation state of a driver-operated driving operation device. As a result, a control that accommodates the driving operations intended by the driver can be executed. The driving operation device is, for example, an accelerator pedal 71. It is also possible to detect a control transition based on the actuation state of a brake pedal instead of an accelerator pedal 71.

(6) When it detects a transition from a state in which the following distance control was operating to a state in which the RP conveyance control is operating, the controller 150 modifies the braking/driving force controlled by the RP conveyance control. More specifically, the controller 150 executes control contrived to modify the braking/driving force when the mode changes from Mode 3 to Mode 4. Thus, by modifying the braking/driving force when the system 1 switches between the two different controls, the control transition can be accomplished smoothly without impeding the driver's ability to drive (operate) the vehicle in accordance with his or her intent.

(7) When the controller 150 modifies the braking/driving force controlled by the RP conveyance control, it bases the modification on the target deceleration rate dg2o that was being used by the following distance control at the point in time of the transition, the target deceleration rate of the RP conveyance control, and the accelerator pedal actuation amount Ap. As a result, when the system 1 switches from following distance control to RP conveyance control, the control transition can be accomplished smoothly without impeding the driver's ability to drive (operate) the vehicle in accordance with his or her intent.

(8) More specifically, the target deceleration rate dg used in order to modify the braking/driving force is calculated by selecting the smaller of a braking/driving force modification amount (e.g., repulsive torque rf2o) corresponding to the target deceleration rate dg2o that was used by the following distance control at the point in time of the transition and a braking/driving force modification amount (e.g., repulsive torque rf1) corresponding to the target deceleration rate of the RP conveyance control and subtracting from the selected value the driver's requested driving force drv_trq determined based on the accelerator pedal actuation amount Ap. As a result, the control transition can be accomplished smoothly without impeding the driver's ability to drive (operate) the vehicle in accordance with his or her intent. More specifically, when the following distance control is overridden due depression of the accelerator pedal 71 by the driver, a deceleration rate that is larger than the deceleration rate that was imposed by the following distance control does not occur. Furthermore, since the driver's requested driving force drv_trq increases as the amount by which the accelerator pedal 71 is depressed increases, the target deceleration rate will decrease during braking/driving force modification control executed when the following distance control is overridden. As a result, a system that reflects the intent of the driver regarding acceleration can be realized.

(9) The controller 150 stops modifying the braking/driving force when (a) the obstacle with respect to which the risk potential RP was calculated at the point in time of the transition is no longer detected, (b) the braking/driving force modification amount corresponding to the target deceleration rate of the RP conveyance control becomes smaller than the braking/driving force modification amount corresponding to the target deceleration rate dg2o of the following distance control at the point in time of the transition, or (c) a prescribed amount of time T has elapsed since the time of the transition. As a result, a smooth transition from following distance control to RP conveyance control can be accomplished.

In the first embodiment, a "transition in the operating states of the RP conveyance control and the following distance control" means switching between RP conveyance control and following distance control and includes the point in time when the switch actually occurred as well as times occurring slightly before or after the point in time. Thus, the transition should be thought of as a transition process. Meanwhile, "at the point in time of the transition" means the point in time when a switch between RP conveyance control and following distance control actually occurred.

Second Embodiment

A vehicle driving assist system in accordance with a second embodiment of the present invention will now be explained. The basic constituent features of a vehicle driving assist system 1 in accordance with the second embodiment are the same as those of the first embodiment shown in FIGS. 1 and 2. The second embodiment will be explained chiefly by describing its differences with respect to the first embodiment.

In the second embodiment, when the braking/driving force is modified while the following distance control is overridden, the driver's requested driving force drv_trq is modified in a manner that takes into account the accelerator pedal depression rate Apv during the override state.

Figure 14:
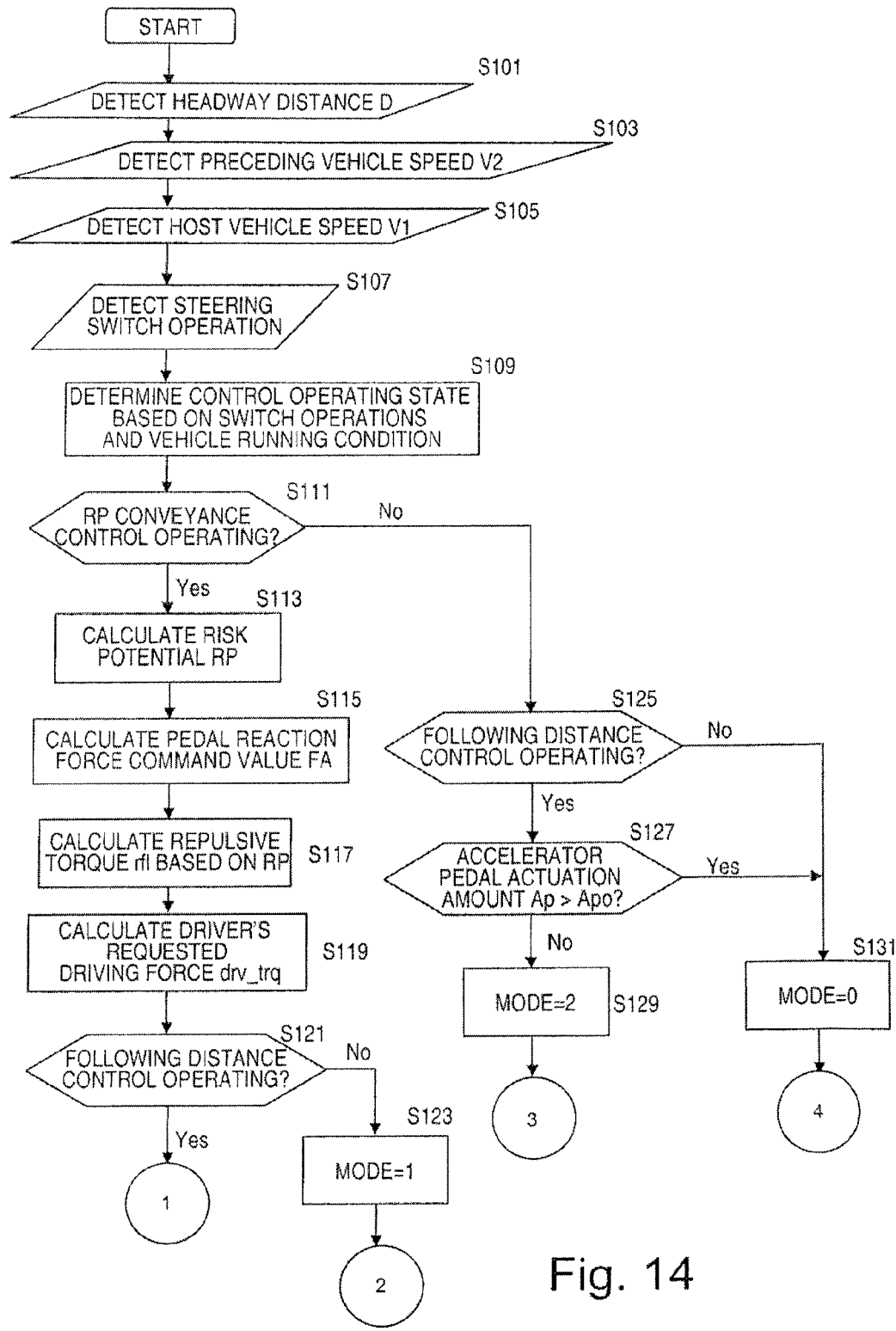
FIG. 14 is a flowchart showing the processing steps of a vehicle driving assistance control program in accordance with a second embodiment of the present invention.
Figure 15:
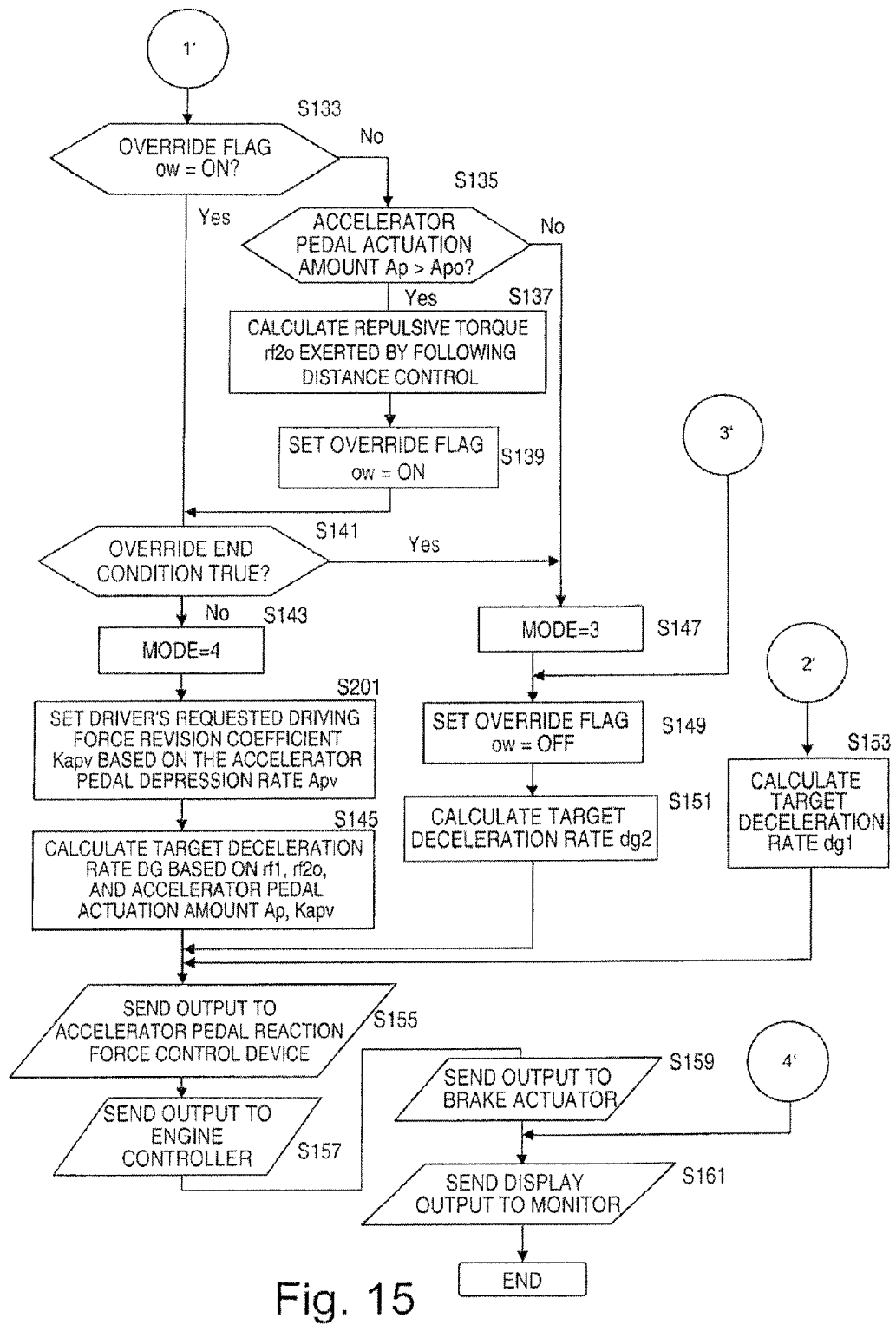
FIG. 15 is a flowchart showing the continuation of the processing steps of the vehicle driving assistance control program shown in FIG. 14.

The operation of a vehicle driving assist system 1 in accordance with the second embodiment will now be explained in detail with reference to FIGS. 14 and 15. FIGS. 14 and 15 are flowcharts showing the processing steps of a driving assistance control program executed by the controller 150. This control loop is executed continuously once per prescribed time period, e.g., every 50 msec. The control processing of the steps S101 to S143 and S145 to S161 is the same as in the flowchart shown in FIGS. 7 and 8 and explanations of those steps are omitted for the sake of brevity.

Figure 16:
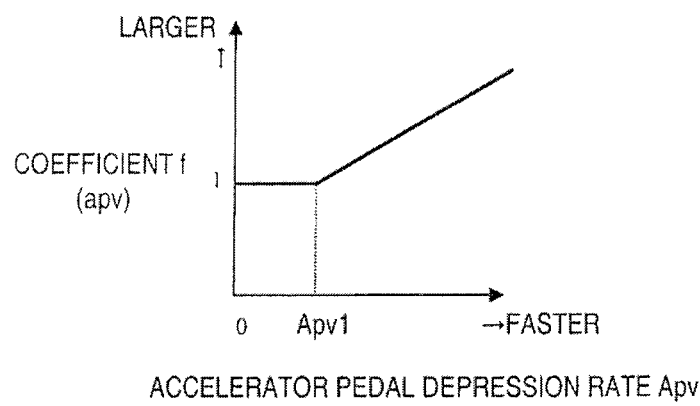
FIG. 16 is a graph plotting a coefficient for modifying the requested driving force versus the accelerator pedal depression rate.

After the system 1 is set to Mode 4 in step S143, the controller 150 proceeds to step S201 and calculates the depression rate Apv of the accelerator pedal 71 during the override state. The accelerator pedal depression rate Apv can be calculated, for example, by finding a derivative of the accelerator pedal actuation amount Ap with respect to time. The controller 150 then calculates a driver's requested driving force modification coefficient Kapv based on the accelerator pedal depression rate Apv. FIG. 16 is a graph plotting a coefficient f(apv) for calculating the driver's requested driving force modification coefficient Kapv versus the accelerator pedal depression rate Apv.

As shown in FIG. 16, the coefficient f(apv) is fixed at a value of 1 for accelerator pedal depression rates Apv ranging from 0 to a prescribed value Apv1. Meanwhile, the coefficient f(apv) increases gradually as the accelerator pedal depression rate Apv increases beyond the prescribed value Apv1. The driver's requested driving force modification coefficient Kapv=f(apv).

After it calculates the driver's requested driving force modifying coefficient Kapv in step S201, the controller 150 proceeds to step S145 and calculates the target deceleration rate dg. First, the controller 150 compares the repulsive torque rf1 of the RP conveyance control calculated in step S117 to the repulsive torque rf2o calculated in step S137 (the repulsive torque rf2o is the repulsive torque imposed by the following distance control at the time when overriding started). The controller 150 then calculates a modified braking/driving force rfc using the Equation 10 shown below based on the smaller of the repulsive torques rf1 and rf2o, the driver requested driving force dr_trq, and the driver requested driving force modification coefficient Kapv.

$$rfc = \min\{rf1, rf2o\} - drv\_trq \times Kapv \qquad \text{(Equation 10)}$$

The target deceleration rate dg can be calculated by multiplying the modified braking/driving force rfc calculated with Equation 10 by the coefficient K2.

In addition to the operational effects exhibited by the first embodiment, the second embodiment also achieves the following additional effects.

(1) The controller 150 can calculate the target deceleration rate to be used for modifying the braking/driving force (braking/driving force modification control) in a manner that takes into account the accelerator pedal depression rate Apv. As a result, the driver's intent with respect to acceleration can be taken into account in the calculation of the target deceleration rate.

(2) The controller 150 sets the driver requested driving force drv_trq such that the larger the accelerator pedal depression rate Aov is, the larger value to which the driver requested driving force drv_trq is set. More specifically, as shown in FIG. 16, the coefficient Kapv that is multiplied by the driver requested driving force drv_trq increases as the accelerator pedal depression rate Apv increases. As a result, the faster the driver depresses the accelerator pedal 71, the smaller the target deceleration rate becomes and, thus, the control is contrived to reflect the driver's intent regarding acceleration.

Third Embodiment

A vehicle driving assist system in accordance with a third embodiment of the present invention will now be explained. The basic constituent features of a vehicle driving assist system 1 in accordance with the third embodiment are the same as those of the first embodiment shown in FIGS. 1 and 2. The third embodiment will be explained chiefly by describing its differences with respect to the first embodiment.

In the third embodiment, the prescribed amount of time T for which the braking/driving force modification control is continued during the override state (state in which following distance control is overridden) is modified based on the difference Δrf between the repulsive torque rf1 of the RP conveyance control and the repulsive torque rf2o of the following distance control at the time when overriding of the following distance control started. The difference Δrf equals rf1 minus rf2o (Δrf=rf1−rf2o).

Figure 17:
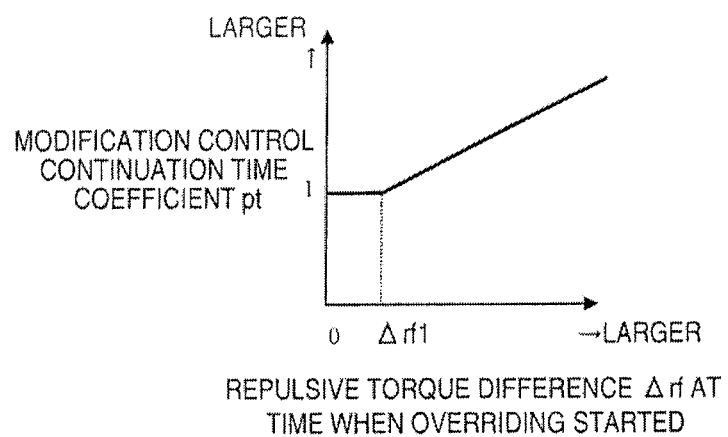
FIG. 17 is a graph plotting a modification control continuation time coefficient versus a repulsive torque difference that existed at the time when overriding occurred.

FIG. 17 shows a graph plotting a modification control continuation time coefficient pt and the repulsive torque difference Δrf at the time when overriding started. As shown in FIG. 17, the coefficient pt is fixed at a value of 1 for differences Δrf ranging from 0 to a prescribed value Δrf1. Meanwhile, the coefficient pt increases gradually as the difference Δrf increases beyond the prescribed value Δrf1, i.e., as the repulsive torque rf1 of the RP conveyance control increases with respect to the repulsive torque rf2o of the following distance control. The modified time value Tc of the braking/driving force modification control continuation time T is calculated using Equation 11 shown below.

$$Tc = T \times pt \quad \text{(Equation 11)}$$

If it determines in step S141 that the modified time Tc has elapsed since overriding started, the controller 150 proceeds to step S147 and sets the system 1 to Mode 3, in which only following distance control is executed. Meanwhile, if the modified time Tc has not yet elapsed since overriding started, and another condition is not satisfied, the controller 150 determines that the override state exists and proceeds to step S143, where it sets the mode to Mode 4, i.e., RP conveyance control only.

In addition to the operational effects exhibited by the first embodiment, the third embodiment also achieves the following additional effects.

The controller 150 sets the braking/driving force modification control continuation time (prescribed amount of time) T in a variable fashion based on the difference between a braking/driving force modification amount corresponding to the target deceleration rate of the following distance control at the point in time of the transition and a braking/driving force modification amount corresponding to the target deceleration rate of the RP conveyance control. More specifically, as shown in FIG. 17, the coefficient pt of the braking/driving force modification control continuation time T is set such that it becomes larger as the difference Δrf (=rf1−rf2o) between the repulsive torque rf2o of the following distance control at the point in time of the transition and the repulsive torque rf1 of the RP conveyance control increases. As a result, since the braking/driving force modification control continuation time T increases as the difference Δrf increases, a smooth control transition can be accomplished.

Variation

In the first to third embodiments, the braking/driving force controlled by the RP conveyance control is modified when the following distance control is overridden and the system 1 switches to RP conveyance control. However, the invention is not limited to such an arrangement. It is also possible to configure the vehicle driving assist system such that when it detects a transition from a state in which the following distance control was operating to a state in which the RP conveyance control is operating, the controller 150 modifies an actuation reaction force controlled by the RP conveyance control. More specifically, a supplemental characteristic added to the accelerator pedal reaction force by the RP conveyance control at the time when overriding starts can be set in a variable manner. For example, the supplemental characteristic can be set such that the slower the accelerator pedal depression rate Apv is at the time when the overriding starts, the more gradually the accelerator pedal reaction force increases as the accelerator pedal is depressed.

It is also possible to configure the vehicle driving assist system such that when it detects a transition from a state in which the following distance control was operating to a state in which the RP conveyance control is operating, the controller 150 modifies the risk potential RP of the vehicle with respect to the obstacle.

Similarly to the embodiments, a smooth transition from following distance control to RP conveyance control can be achieved by modifying the actuation reaction force or the risk potential RP.

Fourth Embodiment

Figure 18:
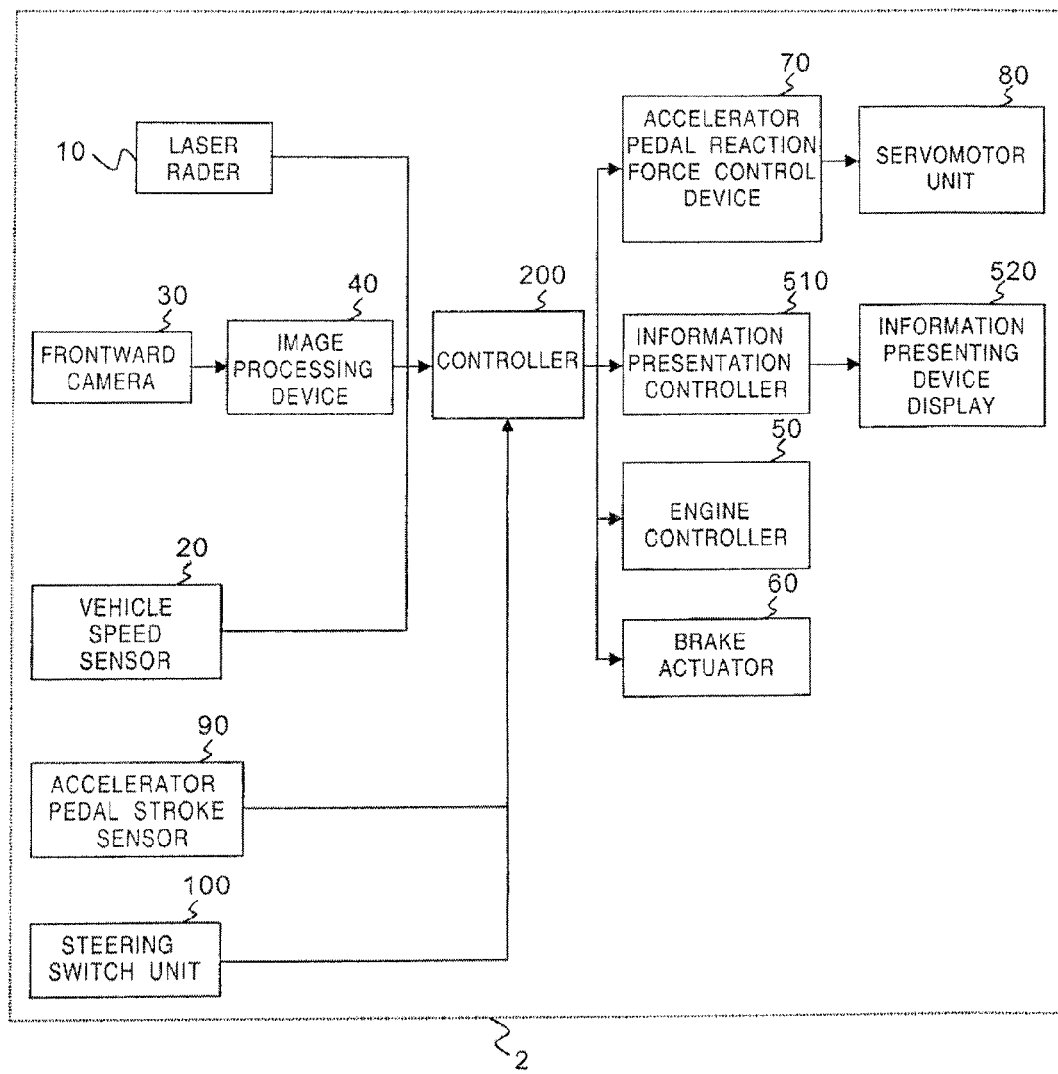
FIG. 18 is a system diagram of a vehicle driving assist system in accordance with a fourth embodiment of the present invention.

A vehicle driving assist system in accordance with a fourth embodiment of the present invention will now be explained. FIG. 18 is a system diagram of a vehicle driving assist system 2 in accordance with the fourth embodiment. In FIG. 18, parts having the same functions as the parts of the first embodiment shown in FIGS. 1 and 2 are indicated with the same reference numerals. The fourth embodiment will be explained chiefly by describing its differences with respect to the first embodiment.

As shown in FIG. 18, a vehicle driving assist system 2 in accordance with the fourth embodiment comprises a laser radar 10, a vehicle sensor 20, a frontward camera 30, an image processing device 40, an accelerator pedal stroke sensor 90, a steering switch unit 100, a controller 200, an accelerator pedal reaction force control device 70, a servomotor 80, an information presentation controller 510, and an information presenting device 520. The information presenting device 520 comprises, for example, an indicator lamp for RP conveyance control and an indicator lamp for following distance control.

Similarly to the first to third embodiments, the fourth embodiment executes RP conveyance control and following distance control. However, in this embodiment, the RP conveyance control is configured to control only the actuation reaction force of the accelerator pedal 71 based on the risk potential RP and does not control the braking/driving force.

Figure 19:
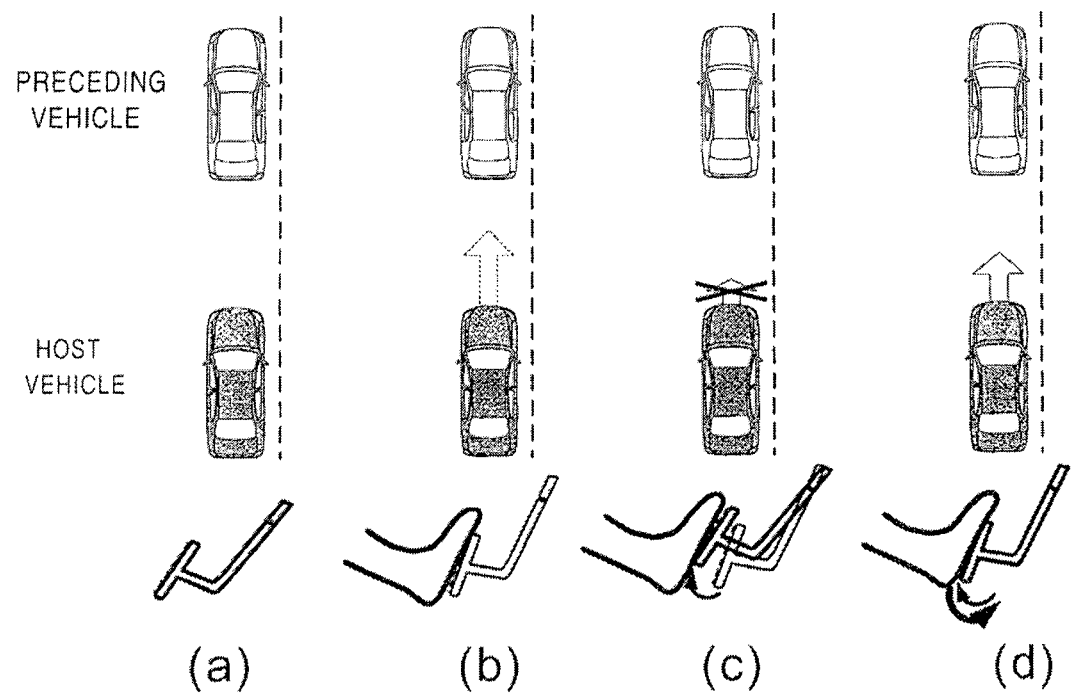
FIG. 19 is a series of diagrams (a) to (d) showing the operation of a vehicle driving assist system in accordance with the fourth embodiment of the present invention.

The operation of a vehicle driving assist system 2 in accordance with the fourth embodiment will now be explained. First, an overview of the operation will be provided. When following distance control is operating, the driver's foot is away from the accelerator pedal as shown in diagram (a) of FIG. 19. If the driver depresses the accelerator pedal 71 while following distance control is operating, the following distance control is overridden and the vehicle driving assist system 2 switches to RP conveyance control (diagram (b) of FIG. 19). With a conventional vehicle driving assist system, the start of RP conveyance control causes the actuation reaction force of the accelerator pedal to increase rapidly in accordance with the risk potential with respect to the preceding vehicle. Consequently, the accelerator pedal 71 becomes difficult to depress and the driver feels as though there is a barrier impeding the motion of the accelerator pedal 71 (diagram (c) of FIG. 19). Afterwards, if the driver still attempts to accelerate, the accelerator pedal 71 will be stiff due to the actuation reaction force corresponding to the risk potential RP and it will be difficult to accelerate (diagram (d) of FIG. 19).

In short, with a conventional system, when the following distance control is overridden and the system switches to RP conveyance control, the actuation reaction force increases in accordance with the risk potential RP and the driver cannot easily depress the accelerator pedal 71 and accelerate even if such is his or her intent. In other words, it is difficult for the driver to operate the vehicle in accordance with his or her intent. Conversely, with the fourth embodiment, the accelerator pedal actuation reaction force is increased gradually starting from before the following distance control is overridden and operation of the RP conveyance control starts.

Figure 20:
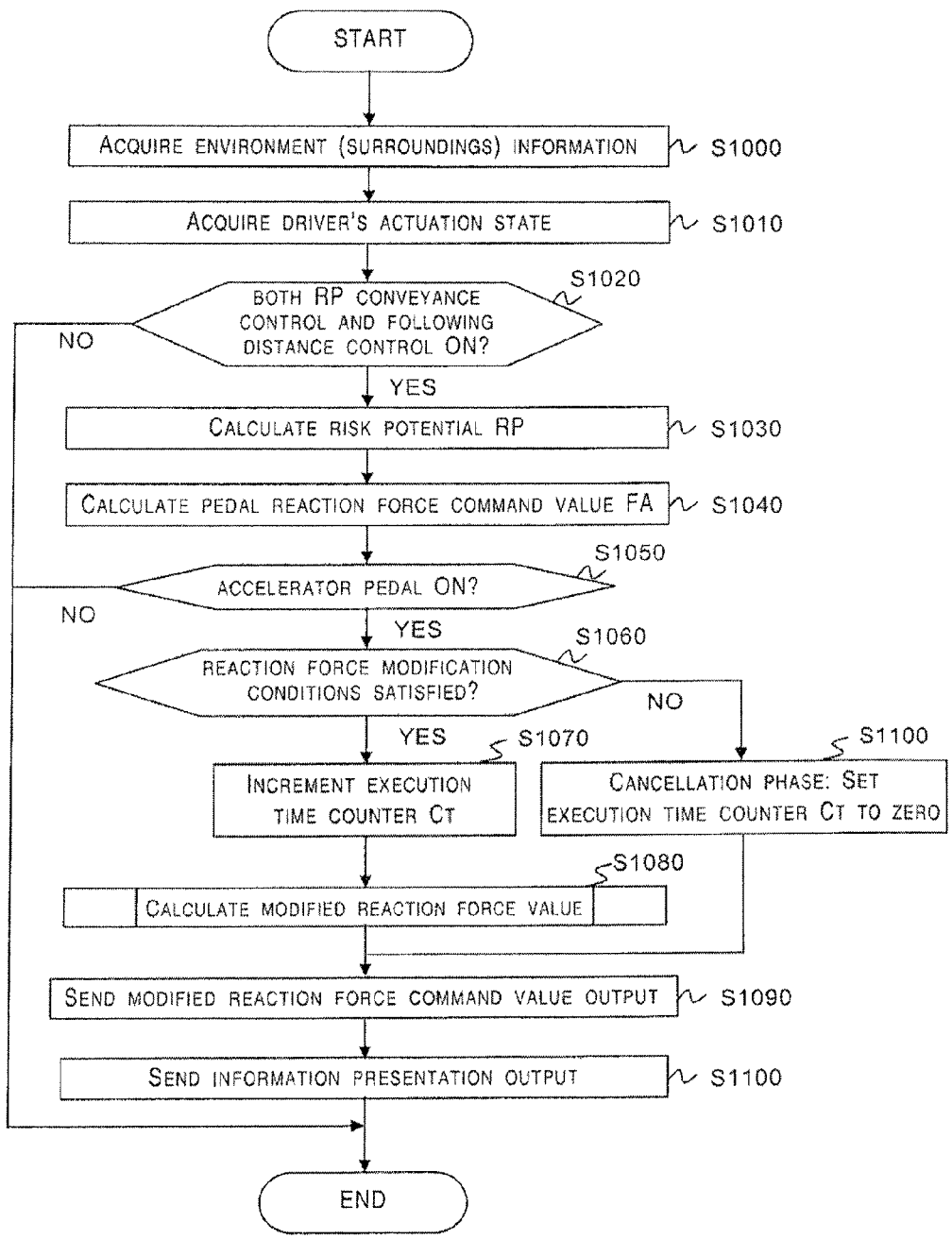
FIG. 20 is a flowchart showing the processing steps of a vehicle driving assistance control program in accordance with the fourth embodiment of the present invention.

The operation of a vehicle driving assist system 2 in accordance with the fourth embodiment will now be explained with reference to FIG. 20. FIG. 20 is a flowchart showing a portion of the processing steps of a driving assistance program executed by the controller 200. More specifically, the flowchart of FIG. 20 shows the control steps executed when the following distance control is overridden and the vehicle driving assist system 2 switches to RP conveyance control. This control loop is executed continuously once per prescribed time period, e.g., every 50 msec.

In step S1000, the controller 200 acquires information regarding the vehicle and the surroundings (environment) of the vehicle. More specifically, the controller 200 reads in signals from the laser radar 10 and the image processing device 40 indicating the headway distance D and relative velocity Vr between the vehicle and the preceding obstacle and a signal from the vehicle speed sensor 20 indicating the host vehicle speed V1. In step S1010, the controller 200 reads the detection signal from the accelerator pedal stroke sensor 90 and determines accelerator pedal actuation state. More specifically, the controller 200 acquires the depression amount (actuation amount) Ap of the accelerator pedal 71 detected by the accelerator pedal stroke sensor 90. Additionally, the depression rate Apv of the accelerator pedal 71 is calculated by, for example, finding a derivative of the accelerator pedal actuation amount Ap with respect to time.

In step S1020, the controller 200 acquires an operation signal from the steering switch unit 100 operated by the driver and determines if both the RP conveyance control and the following distance control are in the operating state (ON) based on the acquired operation signal. If the RP conveyance control and the following distance control are both on (ON), the controller 200 proceeds to step S1030. If at least one of the controls is off (OFF), the controller 200 ends the control sequence. If one or the other of the RP conveyance control and the following distance control is on, the control that is on is executed alone. The details of the RP conveyance control and the following distance control are the same as in the first to third embodiments and explanations thereof are omitted for the sake of brevity.

In step S1030, the controller 200 calculates the risk potential RP. The risk potential RP with respect to the preceding obstacle can be calculated in the same manner as in the first to third embodiments. However, in this embodiment, the risk potential RP is calculated with Equation 11 shown below using the time to collision TTC and the time to headway THW between the vehicle and the preceding obstacle.

$$RP = a/THW + b/TTC \quad \text{(Equation 11)}$$

In Equation 11, the terms "a" and "b" are constants serving to appropriately weight the inverse of the time to headway THW and the inverse of the time to collision TTC. The constants "a" and "b" are set in advance to appropriate values, e.g., a=1 and b=8 (a<b).

In step S1040, the controller 200 calculates an accelerator pedal reaction force command value FA based on the risk potential RP calculated in step S1030. The accelerator pedal reaction force command value FA is set to be, for example, proportional to the risk potential RP. It is also possible to calculate the command value FA using the map shown in FIG. 11 as is done in the first embodiment.

In step S1050, the controller 200 reads the accelerator pedal actuation amount Ap detected by the accelerator pedal stroke sensor 90 and determines if the accelerator pedal 71 is being depressed. If the accelerator pedal 71 is being depressed (i.e., if Ap>0), the controller 200 determines that the system 2 is in an override standby state that occurs before the following distance control is overridden and proceeds to step S1060. The override standby state is defined to be a state in which both the RP conveyance control and the following distance control are on and the accelerator pedal 71 is being depressed by an amount Ap that is smaller than a prescribed value Apo for determining if the override state exists.

In step S1060, the controller 1060 determines if the accelerator pedal reaction force should be modified while the system 2 is in the override standby state. An accelerator pedal reaction force modification control is executed if the following execution conditions are satisfied: (1) the same preceding vehicle is detected as the preceding obstacle and (2) the value of an execution time counter Ct is equal to or smaller than a prescribed amount of time Ct1.

The execution time counter Ct expresses the amount of time over which the accelerator pedal reaction force modification control has been executed during the override standby state since the accelerator pedal 71 was depressed. The prescribed amount of time (prescribed execution time counter value) Ct1 is substantially equivalent to the sum of the execution times of a reaction force modification control A and a reaction force modification control B (described later) and is set to a maximum of approximately 30 seconds. If the conditions for executing accelerator pedal reaction force modification control are satisfied, the controller 200 proceeds to step S1070 and increments the execution time counter Ct.

Figure 21:
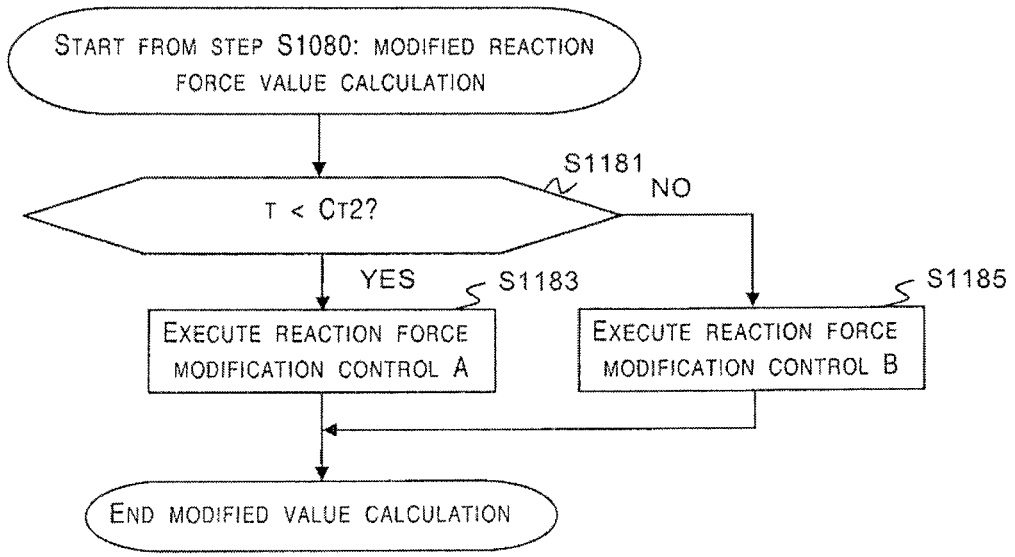
FIG. 21 is a flowchart for explaining the processing steps executed in order to calculate a modified reaction force.

In step S1080, the controller 200 executes control processing for modifying the accelerator pedal reaction force. The accelerator pedal reaction force modification executed during the override standby state includes a reaction force modification control (hereinafter called "reaction force modification control A") executed after the accelerator pedal 71 starts being depressed and a reaction force modification control (hereinafter called "reaction force modification control B") executed as a transition from the reaction force modification control A to the normal RP conveyance control based on the risk potential RP. The control processing executed in order to modify the accelerator pedal reaction force during the override standby state will now be explained with reference to the flowchart of FIG. 21.

Figure 22:
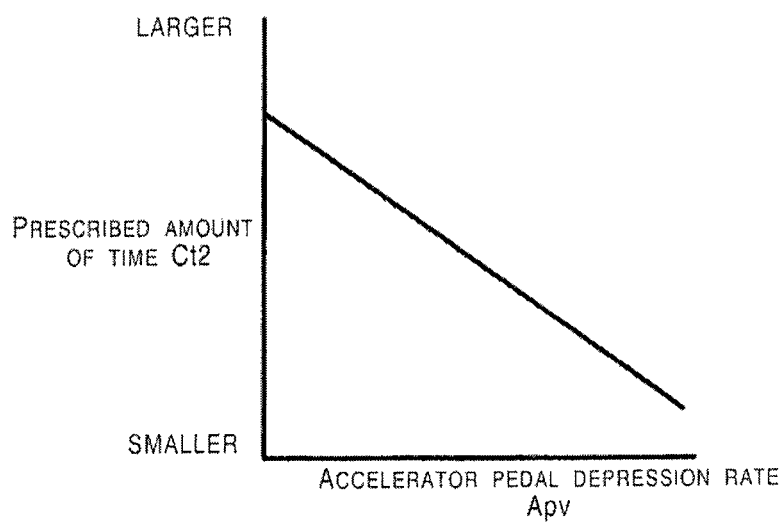
FIG. 22 is a graph plotting a prescribed amount of time for executing a reaction force modification control A versus the accelerator pedal depression rate.

In step S1181, the controller 200 compares the value of the execution time counter Ct after incrementing in step S1070 to a prescribed amount of time Ct2. The prescribed amount of time Ct2 expresses the execution time of the reaction force modification control A and is set in accordance with the depression rate Apv of the accelerator pedal 71. FIG. 22 shows a graph plotting the prescribed amount time Ct2 versus the accelerator pedal depression rate Apv. As shown in FIG. 22, the faster the accelerator pedal depression rate Apv is, the shorter the prescribed amount of time Ct2 becomes and the shorter the amounted time over which the reaction force modification control A is executed. Thus, the more quickly the accelerator pedal 71 is depressed, the shorter the execution time of the reaction force modification control A becomes and the earlier the shift to the reaction force modification control B occurs.

If the value of execution time counter Ct is smaller than the prescribed amount of time Ct2, then the controller 200 proceeds to step S1183 and calculates a modified reaction force command value to be used for the reaction force modification control A. For the prescribed amount of time Ct2, the reaction force modification control A functions to limit the risk potential RP-based accelerator pedal actuation reaction force that would result with normal RP conveyance control. More specifically, a modified command value Fmodified is calculated with the Equation 12 shown below using a modification coefficient Cfm and the reaction force command value FA calculated in step S1040 based on the risk potential RP.

$$F\text{modified} = Cfm \times FA \quad \text{(Equation 12)}$$

The modification coefficient Cfm is set to a value equal to or less than 1, e.g., 0.5.

Figure 23:
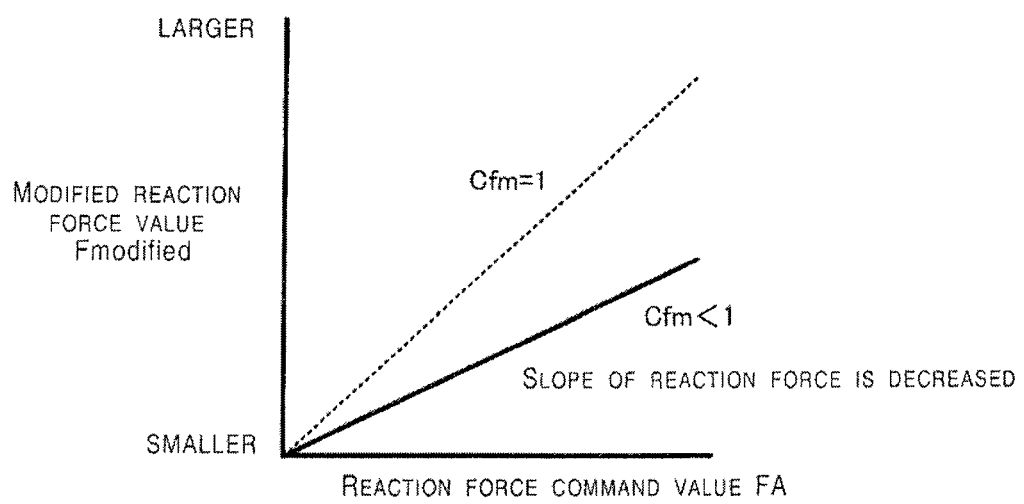
FIG. 23 is a graph plotting a modified reaction force command value versus the reaction force command value.

FIG. 23 shows plots of the modified command value Fmodified versus the reaction force command value FA. When the reaction force command value FA is multiplied by a modification coefficient Cfm that is smaller than 1, the modified command value Fmodified is smaller than the reaction force command value FA calculated in accordance with normal RP conveyance control and the slope of the modified command value Fmodified with respect to the reaction force command value FA decreases.

If it determines in step S1181 that the value of the execution time counter Ct is equal to or larger than the prescribed amount of time Ct2, then the controller 200 proceeds to step S1185 and calculates a modified reaction force command value to be used for the reaction force modification control B. More specifically, when the prescribed amount of time Ct2 elapses and the system 2 shifts to the reaction force modification control B, the modification coefficient Cfm is returned to a value of 1 in a gradual fashion. For example, the modification coefficient Cfm might be gradually increased to a value of 1 (Cfm=1 (100%)) at a rate of 5% per second. The reaction force modification control B calculates the modified command value Fmodified in accordance with the aforementioned Equation 12 using the gradually increasing modification coefficient Cfm. The reaction force modification control B ends when the value of the modification coefficient Cfm reaches 1.

After it calculates the modified reaction force command value Fmodified in step S1080, the controller 200 proceeds to step S1090. Meanwhile, if it determines in step S1060 that the conditions for accelerator pedal reaction force modification control are not satisfied, the controller 200 proceeds to step S1100. Also, when the reaction force modification control B ends, the result of step S1060 will be negative and the controller 200 will proceed to step S1100 because the execution time counter Ct will have exceeded the prescribed time Ct1. In step S1100, the controller 200 enters a cancellation phase of the accelerator pedal reaction force modification control. The controller 200 resets the execution time counter Ct to 0 and sets the modified reaction force command value Fmodified to the accelerator pedal reaction force command value FA calculated in step S1040 as is (i.e., without modification. In other words, in the cancellation phase, the reaction force control is the same as during normal RP conveyance control.

In step S1090, the controller 200 sends the modified reaction force command value Fmodified set in step S1080 or S1100 to the accelerator pedal reaction force control device 70. The accelerator pedal reaction force control device 70 controls the servomotor 80 based on the command from the controller 200 and thereby controls the actuation reaction force exerted when the driver operates the accelerator pedal 71. More specifically, the accelerator pedal reaction force control device 70 causes the accelerator pedal 71 to exert a reaction force equal to the sum of the modified reaction force command value Fmodified and a normal pedal reaction force characteristic that is based on the accelerator pedal actuation amount Ap.

In step S1110, the controller 200 presents information indicating the operating states of the RP conveyance control and the following distance control. More specifically, if the reaction force modification control A is being executed, the controller 200 illuminates the indicator lamp for following distance control and flashes the indicator lamp for RP conveyance control. If the reaction force modification control B is being executed, the controller 200 illuminates the indicator lamp for following distance control and flashes the indicator lamp for RP conveyance control slowly. If the reaction force modification control is in the cancellation phase, the controller 200 flashes the indicator lamp for following distance control slowly and illuminates the indicator lamp for RP conveyance control. After the lamps are illuminated, the current cycle of the control loop ends.

Figure 24:
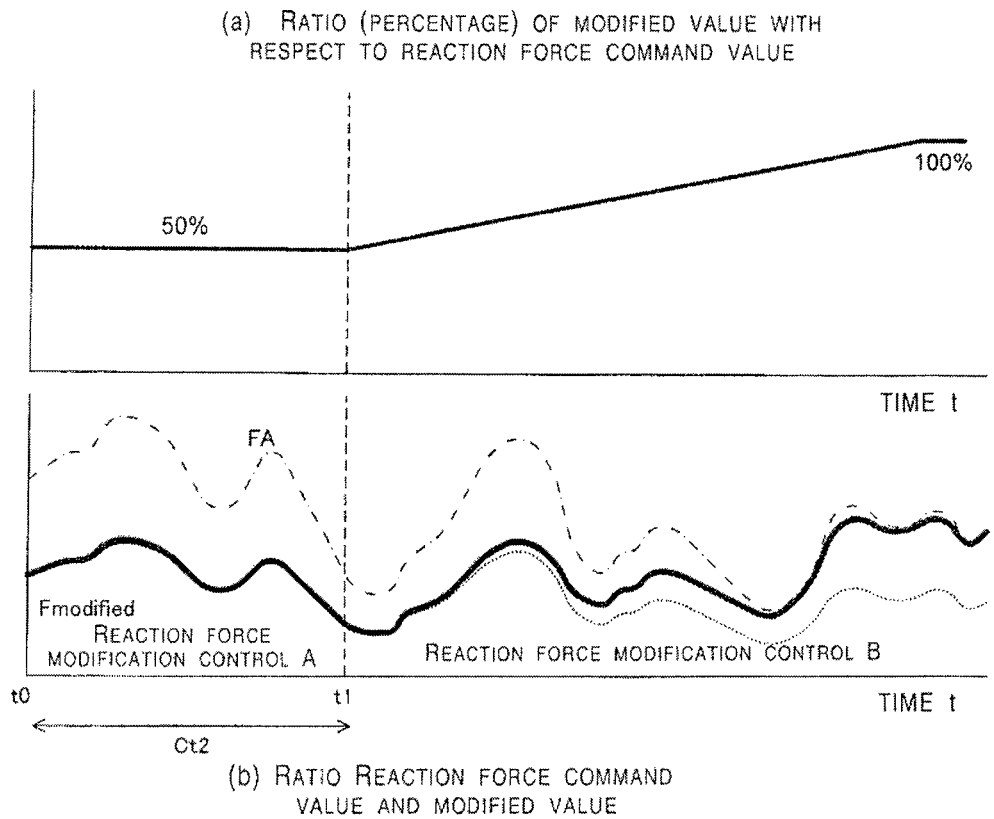
FIG. 24 is a pair of graphs (a) and (b) plotting the operational action of the fourth embodiment of the present invention.

The operational action of the fourth embodiment will now be explained with reference to graphs (a) and (b) of FIG. 24. Graph (a) of FIG. 24 shows how the modification coefficient Cfm, i.e., the ratio (percentage) of the modified value Fmodified with respect to the reaction force command value FA calculated based on the risk potential RP, varies with time. Graph (b) of FIG. 24 shows an example of how the reaction force command value FA and the modified value Fmodified.

The time t0 corresponds to the time when accelerator pedal reaction force modification control A starts after the aforementioned execution conditions are satisfied. During the reaction force modification control A, the controller 200 outputs a modified command value Fmodified (solid-line curve) that is calculated by limiting the reaction force command value FA (single-dot chain line curve) calculated based on the risk potential RP. At this stage, the modification coefficient Cfm is set to 0.5 such that the modified command value Fmodified is limited to 50% of the reaction force command value FA. As a result, the modified command value Fmodified changes loosely in accordance with changes in the reaction force command value FA calculated based on the risk potential RP.

At a time t1, the prescribed amount Ct2 has elapsed since the reaction force modification control A started and the controller 200 shifts to the reaction force modification control B. The reaction force modification control B causes the modification coefficient Cfm to increase from 0.5 to 1 at a rate of 5% per second. Thus, the modified command value Fmodified gradually increases from being limited to 50% of the reaction force command value FA (which is based on the risk potential RP) to being equal to 100% of the reaction force command value FA. After the modification coefficient Cfm increases to 1, the reaction force command value FA based on the risk potential RP is used as is and normal RP conveyance control is executed.

Since the prescribed amount of time Ct2 over which the reaction force modification control A is executed is set based on the depression rate Apv of the accelerator pedal 71, the control shifts to RP conveyance control quickly when the driver depresses the accelerator pedal 71 rapidly in an attempt to accelerator, thus enabling information regarding the surroundings of the vehicle to be conveyed to the driver through the accelerator pedal actuation reaction force.

In addition to the operational effects exhibited by the first embodiment, the fourth embodiment also achieves the following additional effects.

(1) The vehicle driving assist system 2 detects a preparation state occurring before the system 2 shifts from a state in which following distance control is operating to a state in which RP conveyance control is operating. If the preparation state is detected, the system 2 limits the RP conveyance control. In other words, before shifting from following distance control to actual RP conveyance control, the system 2 executes a limited RP conveyance control. As a result, the fact that the system 2 will switch to RP conveyance control can be conveyed to the driver in advance and the control imposed by the system 2 can be prevented from being at odds with the intent of the driver regarding driving the vehicle.

(2) The vehicle driving assist system 2 detects the preparation state based on the actuation state of a driver-operated driving operation device. If it detects the preparation state, the system 2 executes control that causes the driving operation device to exert a reaction force that is limited with respect to the actuation reaction force that would result under normal RP conveyances control. The driving operation device is, for example, an accelerator pedal 71. Thus, more specifically, when the accelerator pedal 71 is depressed (Ap>0), the system 2 detects the preparation state (override standby state) and causes the accelerator pedal 71 to exert a limited actuation reaction force. As a result, the accelerator pedal reaction force can be prevented from increasing abruptly at the point in time when the system 2 switches to RP conveyance control and the intent of the driver to accelerate and the control executed by the system 2 can be prevented from conflicting with each other.

(3) The vehicle driving assist system 2 continues modifying the reaction force from the time when the preparation state is detected until a prescribed amount of time Ct1 has elapsed or until the vehicle begins accelerating. By limiting the reaction force modification control to the prescribed amount of time Ct1, the reaction force modification control can be prevented from diminishing the effect of the RP conveyance control, which is intended to convey the risk potential RP to the driver. By continuing the reaction force modification control until acceleration starts, the control executed by the system can be prevented in an effective manner from conflicting with the intent of the driver to accelerate. The determination as to whether the vehicle is accelerating can be accomplished by detecting the acceleration rate of the vehicle. In such a case, an additional condition is added to the aforementioned two execution conditions such that when the determination regarding whether or not to execute reaction force modification control is made in step S1060, the system determines that accelerator pedal reaction force modification should be executed during the override standby state if the vehicle is not accelerating.

(4) The controller 200 sets the prescribed amount of time Ct1 over which it modifies the reaction force during the override standby state in a variable manner based on the accelerator pedal depression rate Apv. More specifically, the larger the accelerator pedal depression rate Apv is, the shorter the value to which the prescribed amount of time Ct2 is set. The prescribed amount of time Ct2 is the continuous amount of time over which the reaction force modification control A is executed to limit the actuation reaction force. As a result, the faster the driver depresses the accelerator pedal 71, i.e., the stronger the driver's intent to accelerate is, the quicker the system switches to RP conveyance control.

(5) The vehicle driving assist system 2 informs the driver that it is in the override standby state using at least one of the following methods: visual information, sound information, accelerator pedal vibration, and accelerator pedal clicking. As a result, the driver can be informed that reaction force modification control is in progress and inappropriate operation of the vehicle and misunderstandings regarding the operating state of the system can be avoided.

First Variation of the Fourth Embodiment

In the fourth embodiment, the limited (modified) command value Fmodified is calculated by multiplying the reaction force command value FA by a modification coefficient Cfm. In this variation, during the reaction force modification control A, the reaction force command value FA is limited with respect to the risk potential RP during the prescribed amount of time Ct2.

Figure 25:
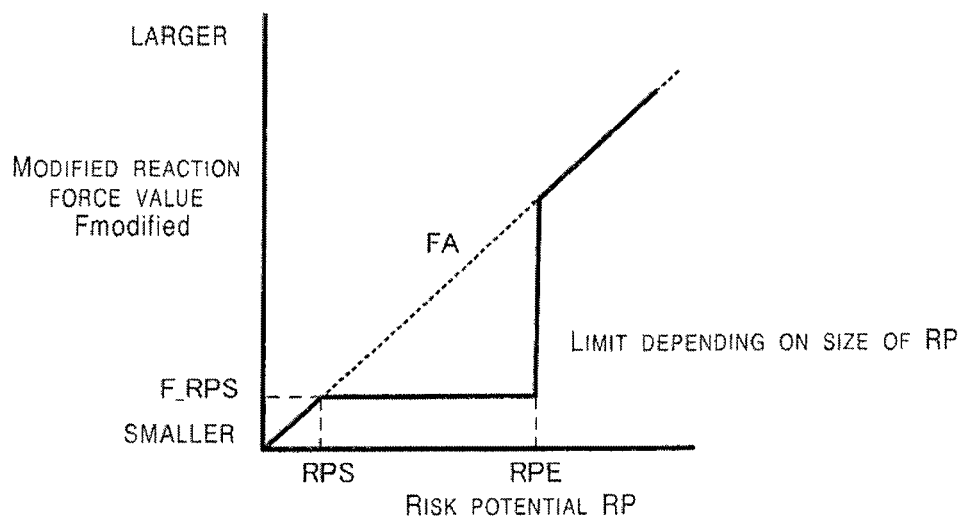
FIG. 25 is a graph plotting the modified reaction force command value versus the risk potential RP in accordance with a first variation of the fourth embodiment of the present invention.

FIG. 25 is a graph plotting the modified command value Fmodified versus the risk potential RP. Normally, the reaction force command value FA increases as the risk potential RP increases, as indicated with the dotted line in the figure. When the risk potential RP is smaller than a prescribed value RPS, the normal reaction force command value FA calculated based the risk potential RP is used as the modified command value Fmodified. When the risk potential RP is equal to or larger than the prescribed value RPS, the modified command value Fmodified is limited to a value F_RPS that equals the reaction force command value FA corresponding to the prescribed value RPS.

When the risk potential RP is larger than a prescribed value RPE (>RPS), again, the normal reaction force command value FA calculated based on the risk potential RP is used as the modified command value Fmodified. The prescribed values RPS and RPE are set to, for example, 1.0 and 3.5, respectively (RPS=1.0 and RPE=3.5).

Thus, in a region of low risk where the risk potential is smaller than the prescribed value RPS, the reaction force command value FA based on the risk potential RP is used as is because it is small enough not to cause the driver to feel that there is something odd about the vehicle behavior. Conversely, when the risk potential RP is equal to or larger than the prescribed value RPS, the reaction force command value FA is limited to the prescribed value F_RPS in order to avoid impeding the driver's ability to operate the pedal. Meanwhile, when the risk potential RP is equal to or larger than the prescribed value RPE, the degree of convergence with respect to the preceding obstacle is high and the reaction force command value FA based on the risk potential RP is used as is in order to quickly urge the driver to perform an appropriate driving operation.

The reaction force command value FA of the accelerator pedal 71 is set such that it increases as the risk potential increases, as indicated with the dotted line in FIG. 25. However, when reaction force modification control is executed after the override standby state (preparation state) is detected, the actuation reaction force command value FA is fixed at a prescribed value F_RPS and does not change with respect increases in the risk potential RP. As a result, the actuation reaction force can be limited such that it does not impede the driver's ability to operate the accelerator pedal 71 when the driver attempts to depress the accelerator pedal 71.

Second Variation of the Fourth Embodiment

In this variation, during the reaction force modification control B, the rate of change of the modified command value Fmodified is varied depending on whether the reaction force command value FA is increasing or decreasing. The difference between the reaction force command value FA calculated in the current cycle and the reaction force command value FAo calculated in the previous cycle is calculated to obtain a change amount ΔF(=FA−FAo). A positive change amount ΔF indicates that the reaction force command value FA is increasing and a negative change amount ΔF indicates the reaction force command value FA is decreasing.

Figure 26:
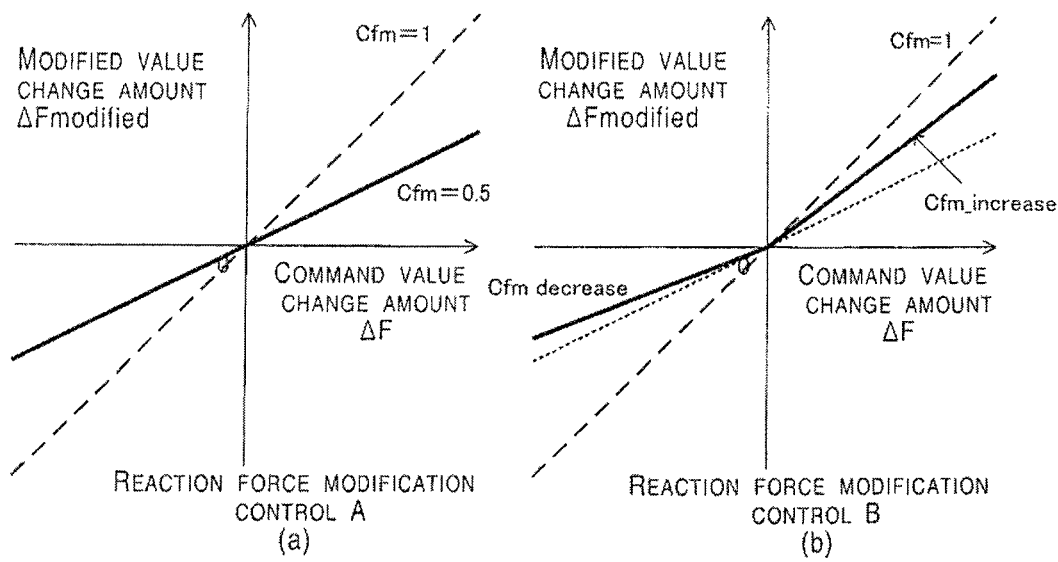
FIG. 26 is a pair of graphs (a) and (b) plotting the modified reaction force command value change amount versus the reaction force command value change amount for the reaction force modification controls A and B, respectively, in accordance with a second variation of the fourth embodiment of the present invention.

Graphs (a) and (b) of FIG. 26 plot the change amount ΔFmodified of the modified command value Fmodified versus the change amount ΔF of the reaction force command value FA during the reaction force modification control A and the reaction force modification control B, respectively. The change amount ΔFmodified is a change rate limiter of the modified command value FAmodified. As shown in graph (a) of FIG. 26, if the modification coefficient Cfm is set to, for example, 0.5 during the reaction force modification control A, then the modified command value change rate ΔFmodified will be smaller than when the modification coefficient Cfm is set to 1 (indicated with broken line). The change amount ΔFmodified is set in the same manner both when the reaction force command value FA increases and when the reaction force command value FA decreases.

When the prescribed time Ct2 has elapsed since the reaction force modification control A started, the system 2 shifts to the reaction force modification control B. As shown in graph (b) of FIG. 26, during the reaction force modification control B, a different modified command value change amount ΔFmodified is used depending on whether the reaction force command value FA is increasing or decreasing. More specifically, the change amount ΔFmodified is calculated using the modification coefficient Cfm_increase when the reaction force command value FA is increasing and the modification Cfm_decrease when the reaction force command value FA is decreasing. The change amount ΔFmodified is set to a larger value when the reaction force command value FA is increasing than when the reaction force command value FA is decreasing.

During the reaction force modification control B, the modified command value Fmodified can be calculated with Equations 13 and 14 shown below.

When reaction force command value FA is increasing (ΔF>0)

$$Fmodified = FAo + \Delta F \times Cfm\_increase \quad \text{(Equation 13)}$$

When reaction force command value FA is deceasing (ΔF<0)

$$Fmodified = FAo + \Delta F \times Cfm\_decrease \quad \text{(Equation 14)}$$

Figure 27:
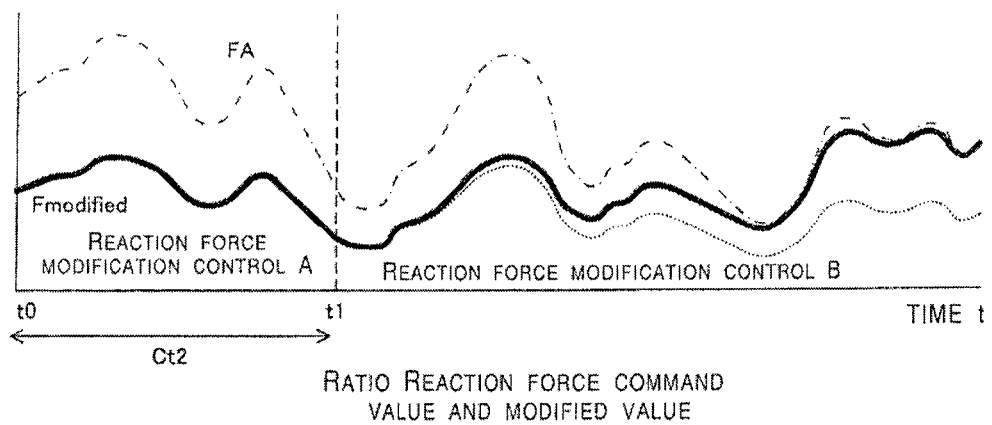
FIG. 27 is a plot illustrating the operational action of the second variation of the fourth embodiment of the present invention.

FIG. 27 shows an example of how the reaction force command value FA and the modified value Fmodified change over time. During the reaction force modification control A, the controller 200 outputs a modified command value Fmodified (solid-line curve) that is calculated by limiting the reaction force command value FA (single-dot chain line curve) calculated based on the risk potential RP. The modified command value Fmodified changes loosely in accordance with changes in the reaction force command value FA.

At a time t1, the prescribed amount Ct2 has elapsed since the reaction force modification control A started and the controller 200 shifts to the reaction force modification control B. During the modification control B, the modified command value Fmodified is calculated using Equation 13 when the reaction force command value FA is increasing and using Equation 14 when the reaction force command value FA is decreasing. As a result, the modified command value Fmodified increases rapidly with respect to increases in the reaction force command value FA and decreases gradually with respect to decreases in the reaction force command value FA. The reaction force modification control B ends when the modified command value Fmodified has increased to where it equals the reaction force command value FA.

Thus the controller 200 changes the manner in which it modifies the reaction force after the override standby state is detected depending on whether the actuation reaction force is increasing or decreasing. As a result, the control can be executed in a smooth manner without causing the driver to experience a feeling that something is odd about the vehicle performance when the control returns (reaction force modification control B) to normal RP conveyance control from a state in which the actuation reaction force is limited (reaction force modification control A).

Third Variation of the Fourth Embodiment

In first variation of the fourth embodiment, during the reaction force modification control A, the reaction force command value FA is limited to a value F_RPS, which is the reaction force command value FA corresponding to a prescribed risk potential value RPS when the risk potential RP is equal to or larger than the prescribed value RPS and smaller than a prescribed value RPE. In this variation, even during the reaction force modification control B the reaction force command value FA is limited to the value F_RPS corresponding to the prescribed value RPS when the risk potential RP satisfies the condition RPS≤RP<RPE. However, during the reaction force modification control B, the prescribed value F_RPS corresponding to the prescribed value RPS is gradually increased.

Figure 28:
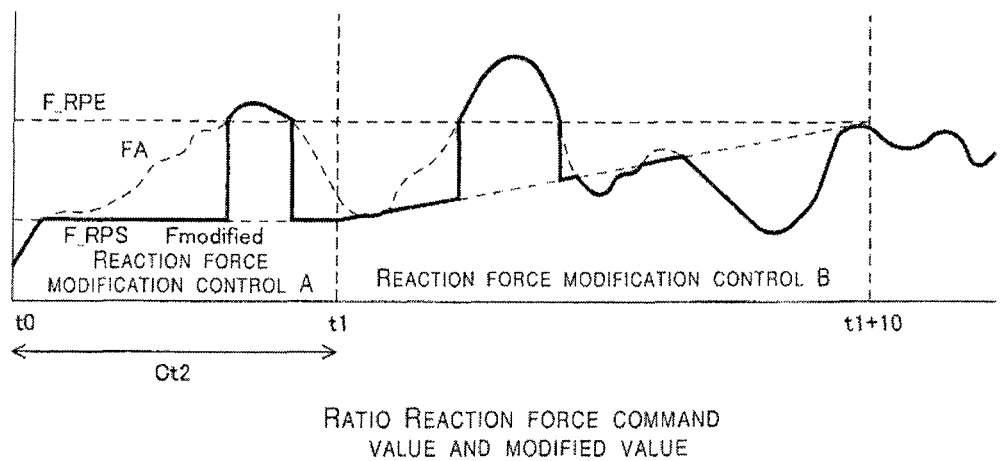
FIG. 28 is a plot illustrating the operational action of a third variation of the fourth embodiment of the present invention.

FIG. 28 shows an example of how the reaction force command value FA calculated based on the risk potential RP and the limited (modified) command value Fmodified change over time. During the reaction force modification control A, the modified reaction force command value Fmodified is limited to a value F_RPS corresponding to a fixed prescribed value RPS (as indicated with the solid-line curve) when the condition RPS≤RP<RPE is satisfied. Once it shifts to the reaction force modification control B, the controller 200 gradually increases the prescribed value RPS at a rate of, for example, 0.25 per second. As a result, the modified reaction force command) value Fmodified (=F_RPS) corresponding to the prescribed value RPS gradually increases. The reaction force modification control B ends when the prescribed value RPS has increased to the prescribed value RPE. The change amount of the prescribed value RPS is set, for example, such that the prescribed value RPS reaches the prescribed value RPE in approximately 10 seconds.

Fifth Embodiment

Figure 29:
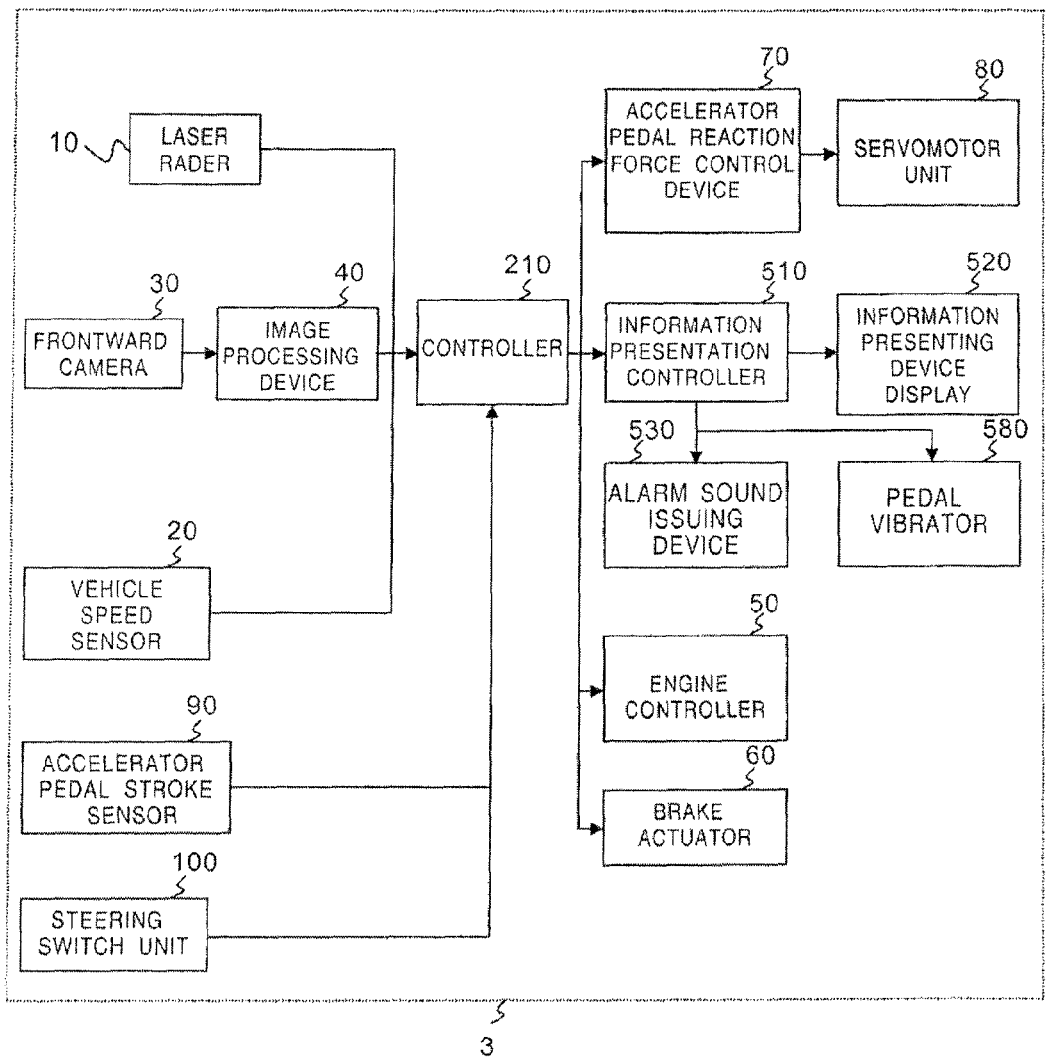
FIG. 29 is a system diagram of a vehicle driving assist system in accordance with a fifth embodiment of the present invention.

A vehicle driving assist system in accordance with a fifth embodiment of the present invention will now be explained. FIG. 29 is a system diagram of a vehicle driving assist system 3 in accordance with the fifth embodiment. In FIG. 29, parts having the same functions as the parts of the fourth embodiment shown in FIG. 18 are indicated with the same reference numerals. The fifth embodiment will be explained chiefly by describing its differences with respect to the fourth embodiment.

As shown in FIG. 29, the vehicle driving assist system 3 in accordance with the fifth embodiment is further equipped with an alarm sound issuing device 530 and a pedal vibrator 580 (i.e., a transducer or other vibration generating device). The alarm sound issuing device 530 is, for example, an alarm sound device configured to generate an alarm sound in response to a command from the information presentation controller 510. The pedal vibrator 580 is, for example, mounted to the pedal surface of the accelerator pedal 71 and configured to vibrate the accelerator pedal 71 in response to a command from the information presentation controller 510.

Also, the RP conveyance control of a vehicle driving assistance device 3 in accordance with the fifth embodiment is contrived to impose a deceleration on the vehicle in addition to controlling the actuation reaction force in accordance with the risk potential RP. When a deceleration is generated against the vehicle as part of the RP conveyance control, a target deceleration rate is calculated based on the repulsive force of an imaginary elastic body provided on the front of the vehicle, similarly to the first embodiment.

In the fifth embodiment, the manner in which the reaction force is modified is changed depending on the state of the vehicle driving assist system. More specifically, the content of the reaction force control is changed at the point in time of a transition between following distance control and RP conveyance control and at a point in time when the vehicle starts accelerating.

Figure 30:
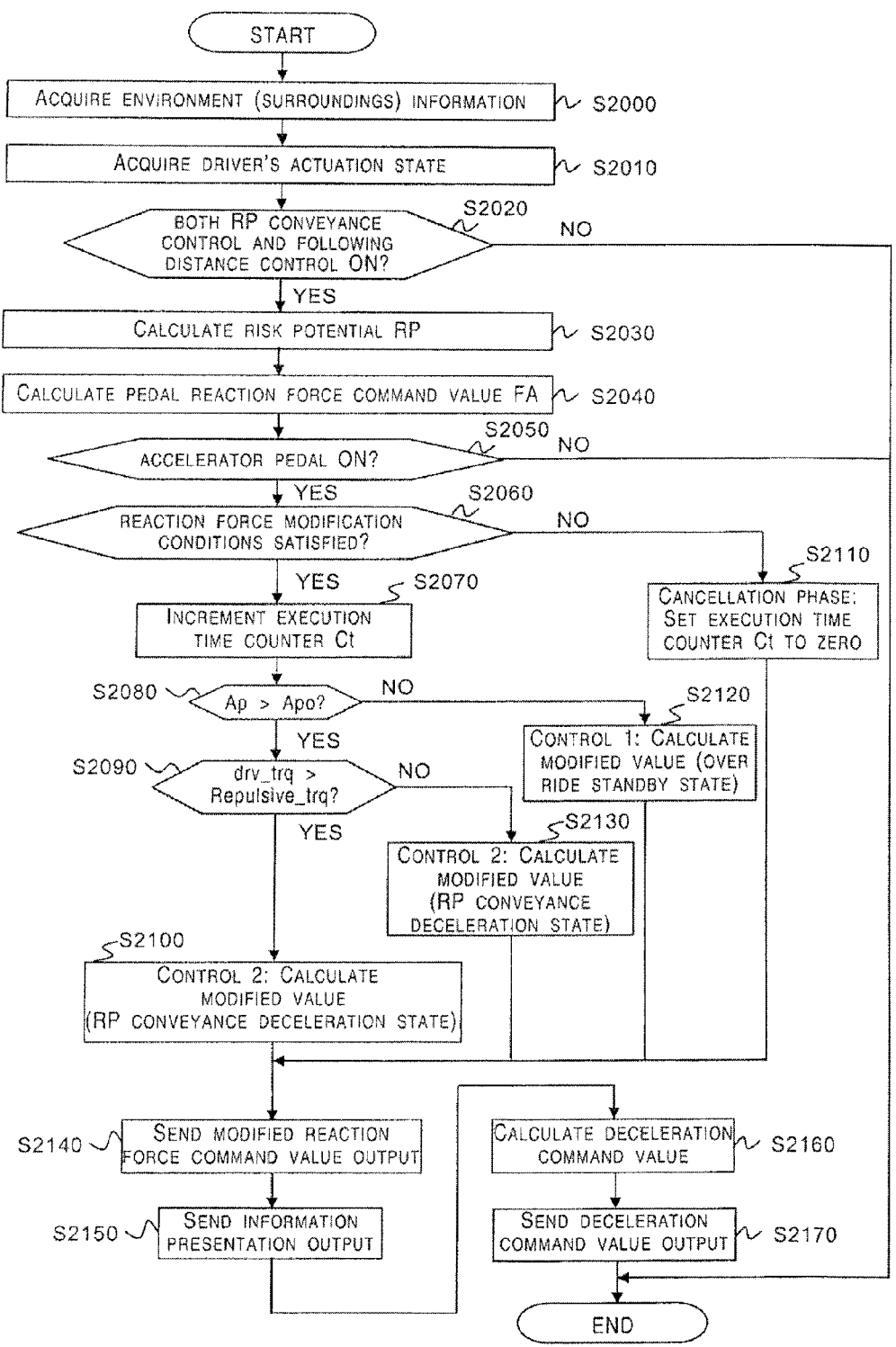
FIG. 30 is a flowchart showing the processing steps of a vehicle driving assistance control program in accordance with the fifth embodiment of the present invention.

The operation of a vehicle driving assist system 3 in accordance with the fifth embodiment will now be explained with reference to FIG. 30. FIG. 30 is a flowchart showing a portion of the processing steps of a driving assistance program executed by the controller 210. More specifically, the flowchart of FIG. 30 shows the control steps executed when the following distance control is overridden and the vehicle driving assist system 3 switches to RP conveyance control. This control loop is executed continuously once per prescribed time period, e.g., every 50 msec. The processing of the steps S2000 to S2070 is the same as in the steps S1000 to S1070 of the flowchart shown in FIG. 20 and explanations of these steps are omitted for the sake of brevity.

In step S2080, the controller 210 determines if the actuation amount Ap of the accelerator pedal operated by the driver is larger than a prescribed value Apo. The prescribed value Apo is a threshold value for determining if the system will shift from a state in which the following distance control is operating to a state in which the following distance control has been overridden due to depression of the accelerator pedal 71. The prescribed value Apo is set to a stroke amount of the accelerator pedal 71 required to achieve a target vehicle speed during following distance control.

If the actuation amount Ap is equal to or smaller than the prescribed value Apo (Ap≤Apo), then the controller 210 determines that the accelerator pedal 71 is being depressed but the following distance control is not overridden, i.e., that the system 3 is in the override standby state, and proceeds to step S2120. If the actuation amount Ap is larger than the prescribed value Apo (Ap>Apo), then the controller 210 determines that the following distance control has been overridden and proceeds to step S2090.

In step S2090, the controller 210 compares the driver's requested driving force drv_trq corresponding to the accelerator pedal actuation amount Ap to a repulsive torque Repulsive_trq. The repulsive torque Repulsive_trq is calculated as a repulsive force of an imaginary elastic body 170 provided on the front of the vehicle using the map shown in FIG. 12, similarly to the first to third embodiments. Thus, the repulsive torque rf1 calculated based on the map of FIG. 12 is used as the repulsive torque Repulsive_trq. If the condition drv_trq≤Repulsive_trq exists, then the repulsive torque Repulsive_trq set by the RP conveyance control is larger than the driver's requested driving force drv_trq and the host vehicle does not accelerate even though the accelerator pedal 71 is being depressed. Thus, the controller 210 determines that the system 3 is in an RP conveyance deceleration state in which the vehicle decelerates during the RP conveyance control. The controller 210 then proceeds to step 2130.

Meanwhile, if the condition drv_trq>Repulsive_trq exists, then the driver's requested driving force drv_trq is larger than the repulsive torque Repulsive_trq set by the RP conveyance control. Therefore, the controller 210 determines that the system 3 is in an RP conveyance acceleration state in which the vehicle accelerates during RP conveyance control. The controller 210 then proceeds to step 2100.

Figure 31:
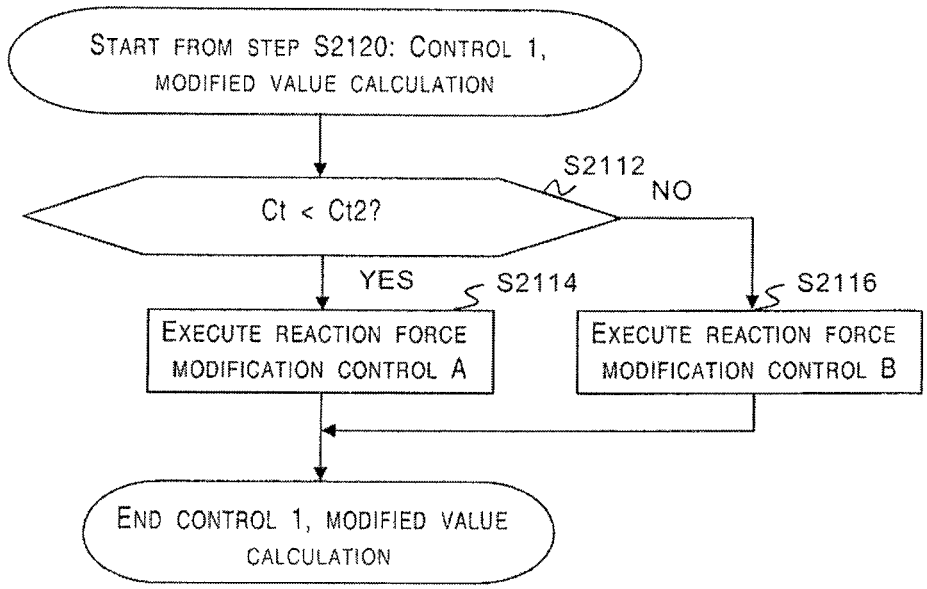
FIG. 31 is a flowchart for explaining the processing steps executed in order to calculate a modified reaction force in accordance with a control 1 of the present invention.

In step S2120, the controller 210 sets the control content of a control 1 to be executed during the override standby state. The control 1 serves to make the driver aware that the following distance control is operating while making it easy for overriding to occur. The control processing executed in order to set the control content of the control 1 will now be explained with reference to the flowchart of FIG. 31. In step S2112, the controller 210 determines if the value of the execution time counter Ct is smaller than a prescribed value Ct2. If so (Yes), the controller 210 proceeds to step S2114 and calculates the modified command value Fmodified in accordance with the reaction force modification control A. The modified command value Fmodified is calculated using the aforementioned Equation 12. The modification coefficient Cfm of Equation 12 is set to, for example, 0.5.

If in step S2112 the controller 210 determines that the value of the execution time counter Ct is equal to or larger than the prescribed value Ct2, the controller 210 proceeds to step S2116 and calculates the modified command value Fmodified in accordance with the reaction force modification control B. The modified command value Fmodified is calculated using the aforementioned Equations 13 and 14. The modification coefficient Cfm_increase for when the reaction force command value FA is increasing is set to, for example, 0.6 and the modification coefficient Cfm_decrease for when the reaction force command value FA is decreasing is set to, for example, 0.4.

Additionally, during the control 1, the controller 210 informs the driver that reaction force modification control is being executed during following distance control by generating a click in the accelerator pedal 71 and issuing visual information. If the driver's foot has just started to depress the accelerator pedal 71 from a state in which it was released from the accelerator pedal 71 during following distance control, the controller 210 generates a single pulse-like click in the accelerator pedal 71. The magnitude and duration of the click reaction force (supplemental reaction force) are set in advance to appropriate values that enable the driver to recognize that the reaction force of the accelerator pedal 71 changed. The controller 210 also flashes the indicator lamp for following distance control slowly and flashes the indicator lamp for RP conveyance control.

Figure 32:
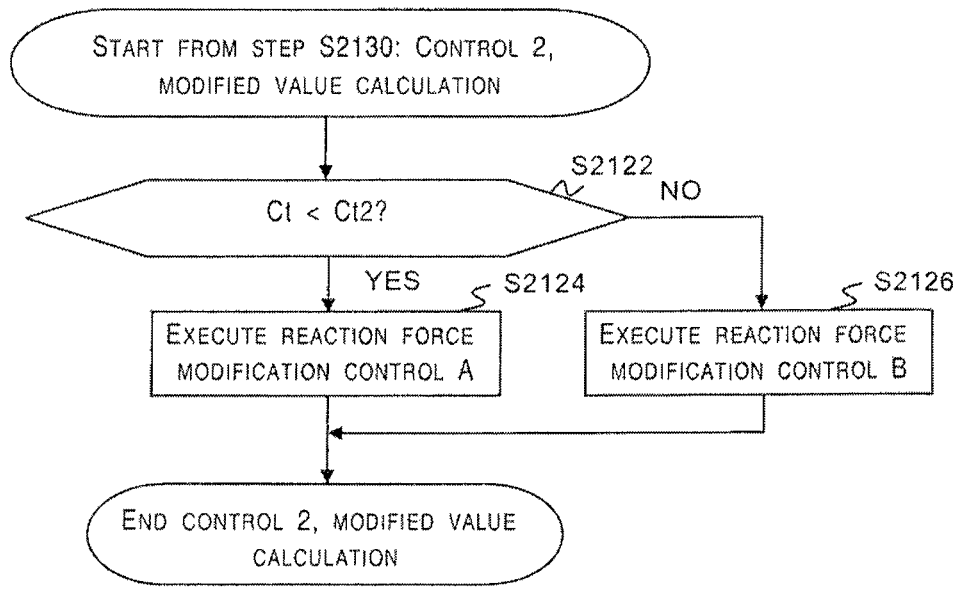
FIG. 32 is a flowchart for explaining the processing steps executed in order to calculate a modified reaction force in accordance with a control 2 of the present invention.

In step S2130, the controller 210 sets the control content of a control 2 to executed during the RP conveyance deceleration state. The control 2 serves to make the driver aware that the RP conveyance control is operating and the vehicle is not accelerating while making it easy for overriding to occur. The control processing executed in order to set the control content of the control 2 will now be explained with reference to the flowchart of FIG. 32. In step S2122, the controller 210 determines if the value of the execution time counter Ct is smaller than a prescribed value Ct2. If so (Yes), the controller 210 proceeds to step S2124 and calculates the modified command value Fmodified in accordance with the reaction force modification control A. The modified command value Fmodified is calculated using the aforementioned Equation 12. The modification coefficient Cfm of Equation 12 is set to, for example, 0.5.

If in step S2122 the controller 210 determines that the value of the execution time counter Ct is equal to or larger than the prescribed value Ct2, the controller 210 proceeds to step S2126 and calculates the modified command value Fmodified in accordance with the reaction force modification control B. The modified command value Fmodified is calculated using the aforementioned Equations 13 and 14. The modification coefficient Cfm_increase for when the reaction force command value FA is increasing is set to, for example, 0.7 and the modification coefficient Cfm_decrease for when the reaction force command value FA is decreasing is set to, for example, 0.4.

Additionally, during the control 2, the system 3 informs the driver that reaction force modification control is being executed while the vehicle is decelerating during RP conveyance control by issuing visual and sound information and generating a vibration in the accelerator pedal 71. More specifically, the indicator lamp for following distance control and the indicator lamp for RP conveyance control are flashed, and an alarm sound (e.g., a "beep" sound) is emitted from the alarm sound device immediately after the controller 210 switches to the control 2. The accelerator pedal 71 is also vibrated. The period and amplitude of the vibration are set in advance to appropriate values that enable the driver to recognize that the accelerator pedal 71 is vibrating.

Figure 33:
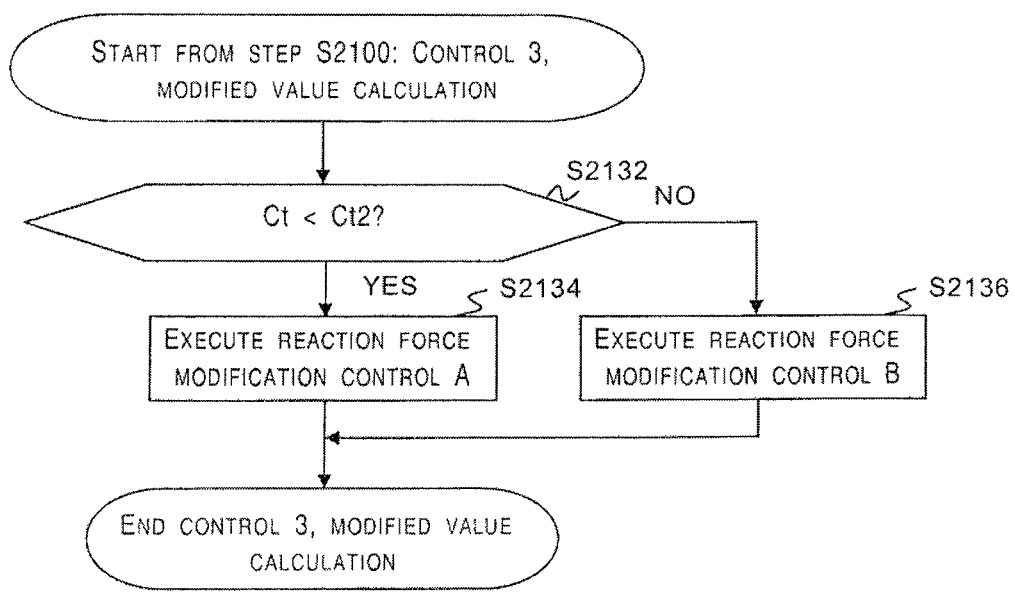
FIG. 33 is a flowchart for explaining the processing steps executed in order to calculate a modified reaction force in accordance with a control 3 of the present invention.

In step S2100, the controller 210 sets the control content of a control 3 to be executed during the RP conveyance acceleration state. The control 3 serves to make the driver aware that the RP conveyance control is operating and reaction force modification control is being executed while making it easy for overriding to occur. The control processing executed in order to set the control content of the control 3 will now be explained with reference to the flowchart of FIG. 33. In step S2132, the controller 210 determines if the value of the execution time counter Ct is smaller than a prescribed value Ct2. If so (Yes), the controller 210 proceeds to step S2134 and calculates the modified command value Fmodified in accordance with the reaction force modification control A. The modified command value Fmodified is calculated using the aforementioned Equation 12. The modification coefficient Cfm of Equation 12 is set to, for example, 0.5.

If in step S2132 the controller 210 determines that the value of the execution time counter Ct is equal to or larger than the prescribed value Ct2, the controller 210 proceeds to step S2136 and calculates the modified command value Fmodified in accordance with the reaction force modification control B. The modified command value Fmodified is calculated using the aforementioned Equations 13 and 14. The modification coefficient Cfm_increase for when the reaction force command value FA is increasing is set to, for example, 0.7 and the modification coefficient Cfm_decrease for when the reaction force command value FA is decreasing is set to, for example, 0.5.

Additionally, during the control 3, the controller 210 informs the driver that reaction force modification control is being executed while the vehicle is accelerating during RP conveyance control by issuing visual and sound information and generating a vibration in the accelerator pedal 71. More specifically, the indicator lamp for following distance control is turned off, the indicator lamp for RP conveyance control is flashed, and an alarm sound (e.g., a "beep" sound) is emitted from the alarm sound device immediately after the controller 210 switches to the control 3. The accelerator pedal 71 is also vibrated. The period and amplitude of the vibration are set in advance to appropriate values that enable the driver to recognize that the accelerator pedal 71 is vibrating.

After the content of the reaction force modification control is determined based on the state of the system, the controller 210 proceeds to step S2140. If in step S2060 it determines that the execution conditions for reaction force modification control have not been satisfied, then the controller 210 proceeds to step S2110 and enters the cancellation phase of the acceleration pedal reaction force modification control.

In step S2140, the controller 210 sends the modified reaction force command value Fmodified set by the control 1 of step S2120, the control 2 of step S2130, the control 3 of the step S2100, or the cancellation phase of step S1100 to the accelerator pedal reaction force control device 70.

In step S2150, the controller 210 sends commands to the information presentation controller 510 in accordance with the control content of the control 1, control 2, control 3, or cancellation phase. The information presentation controller 510 controls the information presenting device 520, the alarm sound issuing device 530, and the pedal vibrator 580 based on the commands from the controller 210 and, thereby, causes visual information, sound information, and a pedal vibration or click to be issued in accordance with the set control content.

In step S2160, the controller 210 calculates a target deceleration rate (deceleration rate command value) to be used during RP conveyance control. The target deceleration rate is calculated based on the repulsive force of an imaginary elastic body 170 like that shown in the diagrams (a) and (b) of FIG. 9, similarly to the first embodiment. In step S2170, the controller 210 sends the deceleration rate command value calculated in step S2160 to the engine controller 50 and the brake controller 60. After the command values are sent, the current cycle of the control loop ends.

Variations 1 to 3 of the fourth embodiment can also be employed in the controls 1 to 3 and the same effects can be obtained when these variations are used.

The fifth embodiment just described can provide the following operational effects in addition to the effects provided by the first to fourth embodiments.

(1) The controller 210 changes the manner in which it modifies the reaction force after the override standby state is detected depending on the control states of the RP conveyance control and the following distance control. As a result, the driver can be informed as to what kind of control the vehicle driving assist system 3 is executing and the reaction force can be modified in a manner that is well-matched to the control that is being executed.

(2) The controller 210 executes the reaction force modification differently depending on whether the system 3 is in a state in which following distance control is operating, a state in which RP conveyance control is operating and the vehicle is not accelerating, or a state in which RP conveyance control is operating and the vehicle is accelerating. As a result, the reaction force modification control can be executed in a manner that is well-matched to changes in the state of the system and vehicle, such as changing to or from a state in which following distance control is operating or a state in which the vehicle is accelerating.

Sixth Embodiment

A vehicle driving assist system in accordance with a sixth embodiment of the present invention will now be explained. The basic constituent features of a vehicle driving assist system in accordance with the sixth embodiment are the same as those of the fourth embodiment shown in FIG. 18. The fifth embodiment will be explained chiefly by describing its differences with respect to the fourth embodiment.

In the sixth embodiment, the content of the reaction force modification control is varied depending on the relative positioning and movement of the vehicle with respect to an obstacle, e.g., a preceding vehicle, existing in front of the vehicle. More specifically, the vehicle driving assist system determines what kind of following situation exists when the driver depresses the accelerator pedal 71 and overrides the following distance control and to set the control content in accordance with the determined following situation.

Figure 34:
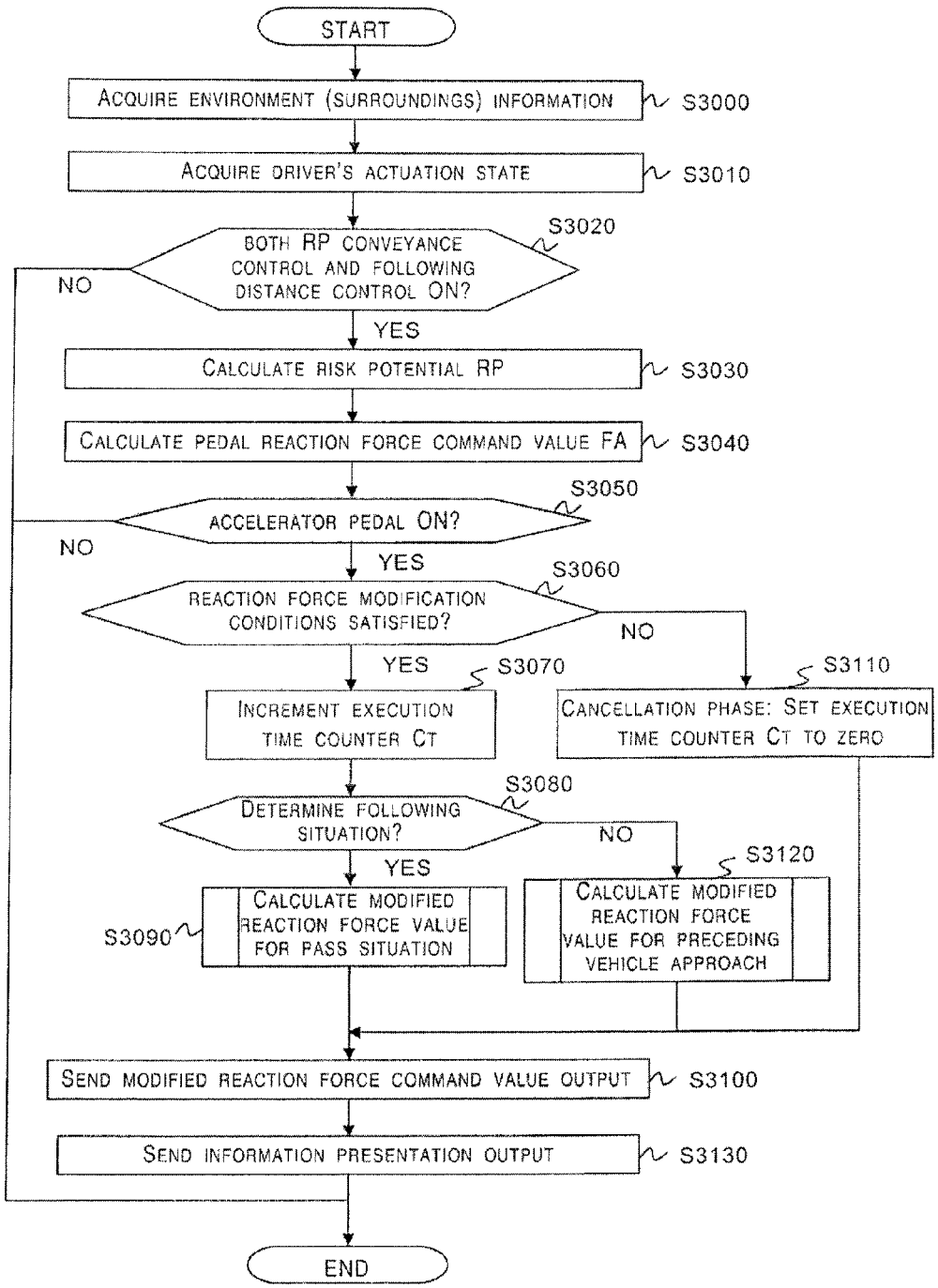
FIG. 34 is a flowchart showing the processing steps of a vehicle driving assistance control program in accordance with a sixth embodiment of the present invention.

The operation of a vehicle driving assist system 3 in accordance with the sixth embodiment will now be explained with reference to FIG. 34. FIG. 34 is a flowchart showing a portion of the processing steps of a driving assistance program executed by the controller 200. More specifically, the flowchart of FIG. 34 shows the control steps executed when the following distance control is overridden and the vehicle driving assist system 3 switches to RP conveyance control. This control loop is executed continuously once per prescribed time period, e.g., every 50 msec. The processing of the steps S3000 to S3070 is the same as in the steps S1000 to S1070 of the flowchart shown in FIG. 20 and explanations of these steps are omitted for the sake of brevity.

In step S3080, the controller 200 determines the following situation existing when the accelerator pedal 71 was depressed and the following distance control was overridden. The determination is made by comparing the set time to headway THWacc that was set by the following distance control to the current time to headway THW between the vehicle and the preceding vehicle. The controller 200 sets the set time to headway THWacc as a fixed value and updates the current time to headway THW consecutively while determining if the relationship expressed by Equation 15 below is satisfied.

$$THWacc \times 0.9 < THW < THWacc \times 1.1 \quad \text{(Equation 15)}$$

If the relationship expressed in Equation 15 is satisfied continuously for a prescribed amount of time (e.g., 5 seconds) or if a directional (turn signal) operation or other operation indicating that the driver intends to change lanes is detected, then the controller 200 determines that the driver is depressing the accelerator pedal 71 in an attempt to pass the preceding vehicle. Otherwise, the controller 200 determines that the driver is depressing the accelerator pedal 71 in an attempt to approach nearer to the preceding vehicle.

Figure 35:
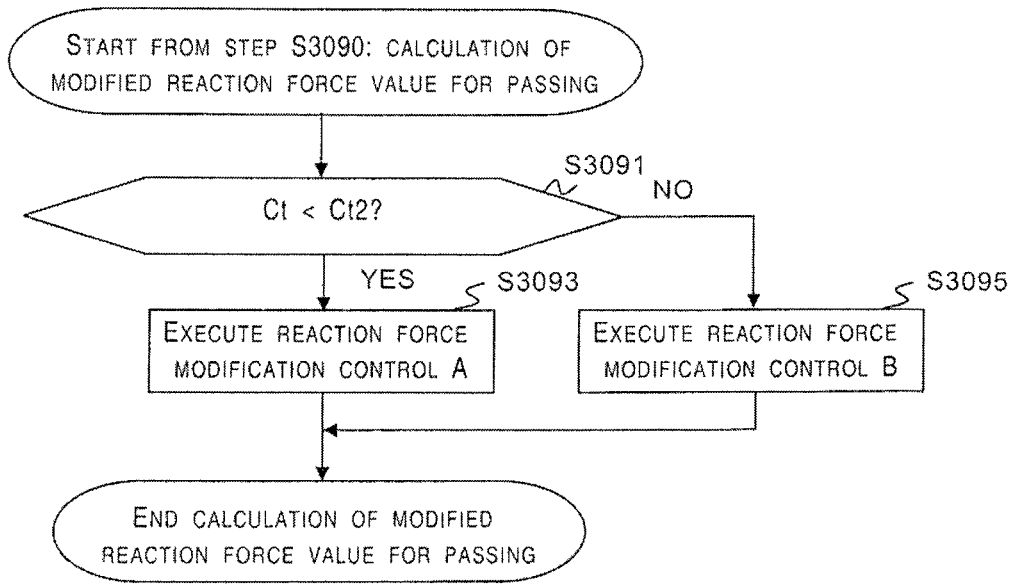
FIG. 35 is a flowchart for explaining the processing steps executed in order to calculate a modified reaction force in accordance with a pass situation.

If it determines that the following situation is a pass situation, then the controller 200 proceeds to step S3090 and executes an accelerator pedal reaction force modification control tailored to pass situations. The reaction force modification control for pass situations will now be explained with reference to the flowchart of FIG. 35. In step S3091, the controller 200 determines if the value of the execution time counter Ct is smaller than a prescribed value Ct2. If so (Yes), then the controller 210 proceeds to step S3093 and calculates the modified command value Fmodified in accordance with the reaction force modification control A.

The modified command value Fmodified is calculated in accordance with the previously described FIG. 25. When the condition RP<RPS exists, the normal reaction force command value FA calculated based on the risk potential RP is used as the modified command value Fmodified. When the condition RP≥RPS exists, the modified command value Fmodified is limited to a value F_RPS that equals the reaction force command value FA corresponding to the prescribed value RPS. When the conditions RP≥RPE (>RPS) exists, again, the normal reaction force command value FA calculated based on the risk potential RP is used as the modified command value Fmodified.

If in step S3091 the controller 200 determines that the value of the execution time counter Ct is equal to or larger than the prescribed value Ct2, then the controller 200 proceeds to step S3095 and calculates the modified command value Fmodified in accordance with the reaction force modification control B. Similarly to the reaction force modification control A, during the reaction force modification control B the reaction force command value FA is limited to the value F_RPS corresponding to the prescribed value RPS when the risk potential RP satisfies the condition RPS≤RP<RPE. However, during the reaction force modification control B, the prescribed value F_RPS corresponding to the prescribed value RPS is gradually increased. More specifically, after it shifts to the reaction force modification control B, the controller 200 gradually increases the prescribed value RPS at a rate of, for example, 0.25 per second and, thereby, increases the value F_RPS of the reaction force command value FA corresponding to the prescribed value RPS (FIG. 28). The reaction force modification control B ends when the prescribed value RPS has increased to the prescribed value RPE.

Figure 36:
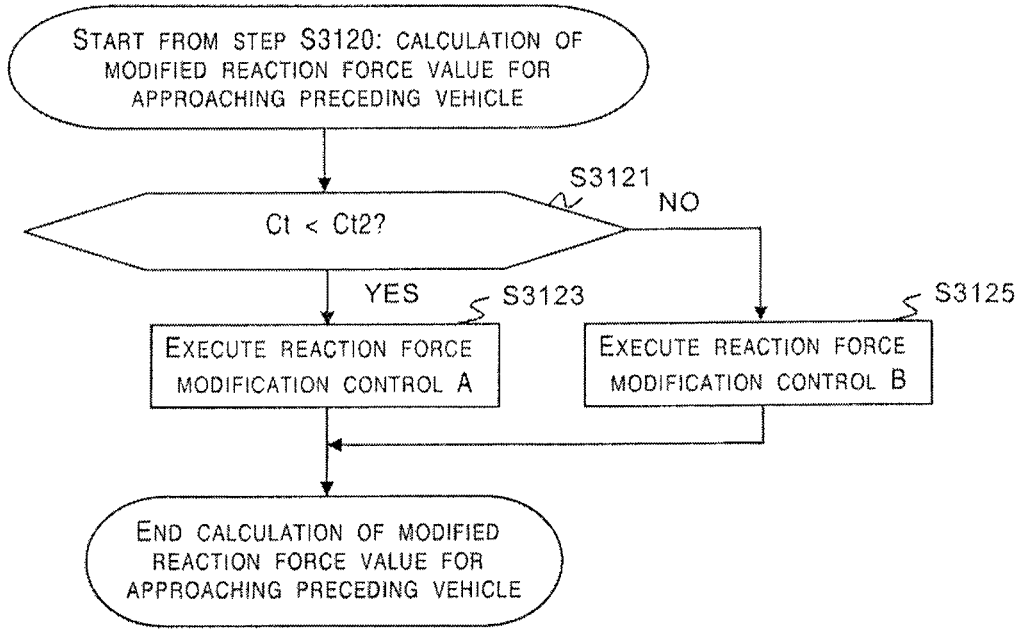
FIG. 36 is a flowchart for explaining the processing steps executed in order to calculate a modified reaction force in accordance with an approach situation.

If it determines that the following situation is an approach situation, then the controller 200 proceeds to step S3120 and executes an accelerator pedal reaction force modification control tailored to approach situations. The reaction force modification control for approach situations will now be explained with reference to the flowchart of FIG. 36. In step S3121, the controller 200 determines if the value of the execution time counter Ct is smaller than a prescribed value Ct2. If so (Yes), the controller 200 proceeds to step S3123 and calculates the modified command value Fmodified in accordance with the reaction force modification control A. The modified command value Fmodified is calculated using the aforementioned Equation 12. The modification coefficient Cfm of Equation 12 is set to, for example, 0.5.

If in step S3121 the controller 200 determines that the value of the execution time counter Ct is equal to or larger than the prescribed value Ct2, then the controller 200 proceeds to step S3125 and calculates the modified command value Fmodified in accordance with the reaction force modification control B. After it shifts to the reaction force modification control B, the controller 200 gradually increases the modification coefficient Cfm to 1. For example, the modification coefficient Cfm might be gradually increased to a value of 1 (Cfm=1 (100%)) at a rate of 5% per second while calculating the modified command value Fmodified using Equation 12. The reaction force modification control B ends when the value of the modification coefficient Cfm reaches 1.

After the content of the reaction force modification control is determined based on the following situation with respect to the preceding vehicle, the controller 200 proceeds to step S3100. If it determines in step S3060 that the execution conditions for reaction force modification control have not been satisfied, then the controller 200 proceeds to step S3110 and enters the cancellation phase of the acceleration pedal reaction force modification control.

In step S3100, the controller 200 sends the modified reaction force command value Fmodified set in step S3090, S3120, or S3110 to the accelerator pedal reaction force control device 70.

In step S3130, the controller 200 presents information indicating the operating states of the RP conveyance control and the following distance control. More specifically, if the reaction force modification control A is being executed, the controller 200 illuminates the indicator lamp for following distance control and flashes the indicator lamp for RP conveyance control. If the reaction force modification control B is being executed, then the controller 200 illuminates the indicator lamp for following distance control and flashes the indicator lamp for RP conveyance control slowly. If the reaction force modification control is in the cancellation phase, then the controller 200 flashes the indicator lamp for following distance control slowly and illuminates the indicator lamp for RP conveyance control. After the command values are sent, the current cycle of the control loop ends.

The method of determining if the driver intends to change lanes is not limited to detecting a change in the time to headway THW or detecting the operation of a directional. Various other methods can also be used. For example, the system can be configured to estimate the driver's intent regarding changing lanes based on the degree of agreement between an actual actuation amount of a driving operation device operated by the driver and a plurality of actuation amounts of the driving operation device operated by imaginary drivers.

The sixth embodiment just described can provide the following operational effects in addition to the effects provided by the first to fifth embodiments.

(1) The controller 200 changes the manner in which it modifies the reaction force after the override standby state is detected depending on the traveling situation of the vehicle. As a result, the reaction force modification can be tailored to the traveling situation of the vehicle.

(2) The traveling situations include a pass situation in which the vehicle passes an obstacle and an approach situation in which the vehicle draws closer to the obstacle. As a result, an appropriate reaction force modification can be executed in accordance with whether the driver is performing a driving operation in order to pass the obstacle or a driving operation in order to approach the obstacle.

Seventh Embodiment

A vehicle driving assist system in accordance with a seventh embodiment of the present invention will now be explained. The basic constituent features of a vehicle driving assist system in accordance with the seventh embodiment are the same as those of the fifth embodiment shown in FIG. 29. The seventh embodiment will be explained chiefly by describing its differences with respect to the fifth embodiment. In the seventh embodiment, similarly to the first embodiment, when the following distance control is overridden and the system switches to RP conveyance control, the target deceleration rate is adjusted to prevent the driver from experiencing a feeling that something is odd about the vehicle behavior due to the deceleration rate becoming larger than it was during the following distance control.

In the seventh embodiment, the system distinguishes among three different states that can occur when the following distance control is overridden due to the accelerator pedal 71 being depressed. More specifically, similarly to the fifth embodiment, the system distinguishes among an override standby state (accelerator pedal actuation amount Ap≤Apo) in which the accelerator pedal 71 is being depressed but the following distance control is not overridden, an RP conveyance deceleration state (drv_trq≤Repulsive_trq) in which the repulsive torque Repulsive_trq set by the RP conveyance control is larger than the driver's requested driving force drv_trq, and an RP conveyance acceleration state (drv_trq>Repulsive_trq) in which the driver's requested driving force drv_trq is larger than the repulsive torque Repulsive_trq set by the RP conveyance control.

However, adjusting the target deceleration rate when the following distance control is overridden makes the RP conveyance deceleration state difficult to recognize based on the deceleration of the vehicle and makes it difficult for the driver to know that the system has switched from the override standby state of the following distance control to the RP conveyance control. Therefore, the seventh embodiment changes the content of the reaction force modification control in accordance with the aforementioned states such that the driver can easily recognize the operating state of the system.

Figure 37:
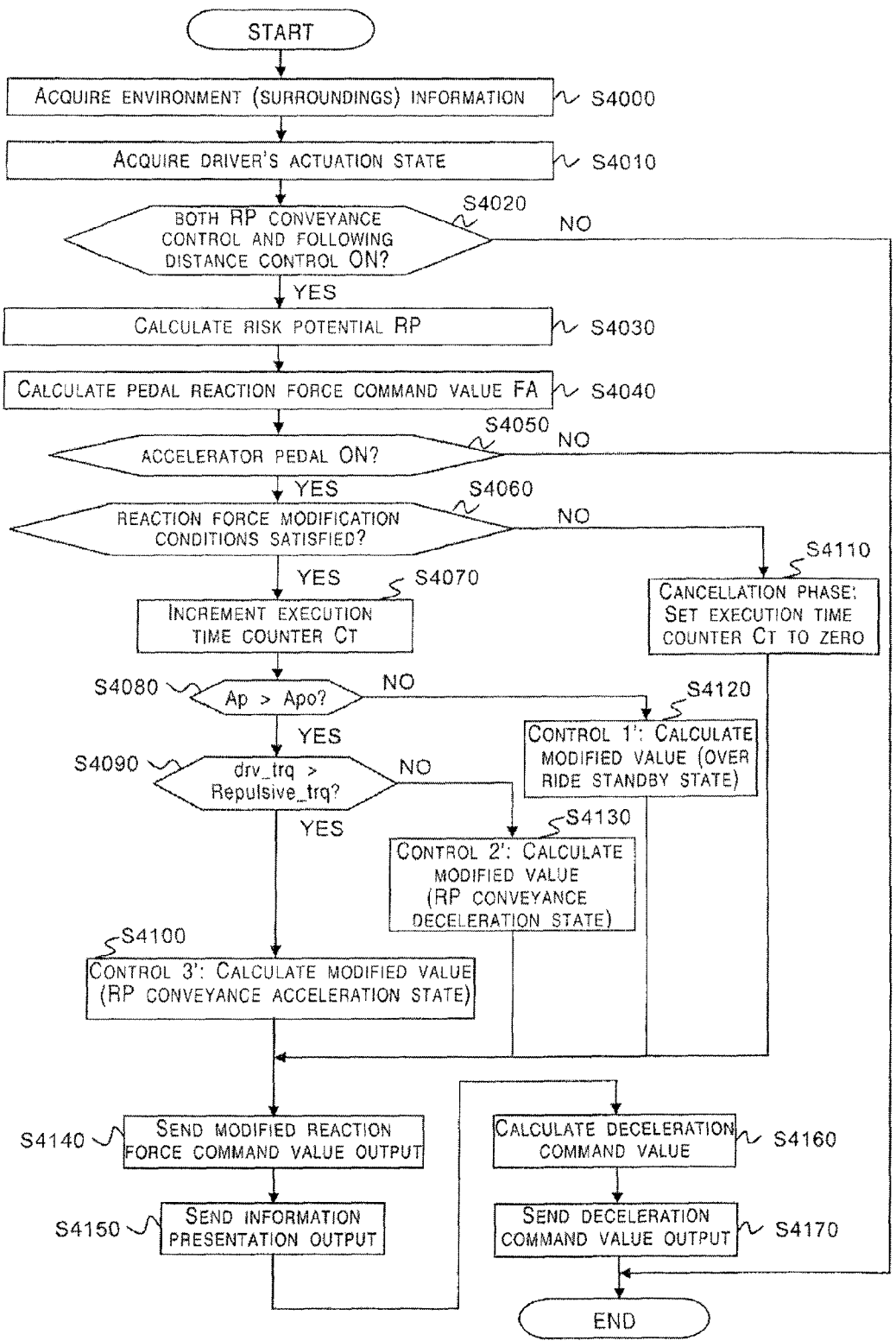
FIG. 37 is a flowchart showing the processing steps of a vehicle driving assistance control program in accordance with a seventh embodiment of the present invention.

The operation of a vehicle driving assist system 3 in accordance with the seventh embodiment will now be explained with reference to FIG. 37. FIG. 37 is a flowchart showing a portion of the processing steps of a driving assistance program executed by the controller 210. More specifically, the flowchart of FIG. 37 shows the control steps executed when the following distance control is overridden and the vehicle driving assist system 3 switches to RP conveyance control. This control loop is executed continuously once per prescribed time period, e.g., every 50 msec. The processing of the steps S4000 to S4070 is the same as in the steps S1000 to S1070 of the flowchart shown in FIG. 20 and explanations of these steps are omitted for the sake of brevity.

In step S4080, the controller 210 compares the accelerator pedal actuation amount Ap to a prescribed value Apo. If the actuation amount Ap is equal to or smaller than the prescribed value Apo (Ap≤Apo), the controller 210 determines that the override standby state exists and proceeds to step S4120. If the actuation amount Ap is larger than the prescribed value Apo (Ap>Apo), then the controller 210 determines that the following distance control has been overridden and proceeds to step S4090. In step S4090, the controller 210 compares the driver's requested driving force drv_trq corresponding to the accelerator pedal actuation amount SA to a repulsive torque Repulsive_trq. If the condition drv_trq≤Repulsive_trq exists, then the controller 210 determines that the RP conveyance deceleration state exists and proceeds to step S4130. If the condition drv_trq>Repulsive_trq exists, then the controller 210 determines that the RP conveyance acceleration state exists and proceeds to step S4100.

In step S4120, the controller 210 sets the control content for a control 1' to be executed during the override standby state. In the control 1', the actuation reaction force dictated by the RP conveyance control is not generated so that the driver can easily recognize that the following distance control is operating. More specifically, the modified command value Fmodified is set to 0 (Fmodified=0) regardless of the value of the execution time counter Ct.

If the driver's foot just started to depress the accelerator pedal 71 from a state in which it was released from the accelerator pedal 71 during following distance control, the system 3 generates a single pulse-like click in the accelerator pedal 71. The magnitude and duration of the click reaction force (supplemental reaction force) are set in advance to appropriate values that enable the driver to recognize that the reaction force of the accelerator pedal 71 changed. The controller 210 also flashes the indicator lamp for following distance control slowly and flashes the indicator lamp for RP conveyance control.

Figure 38:
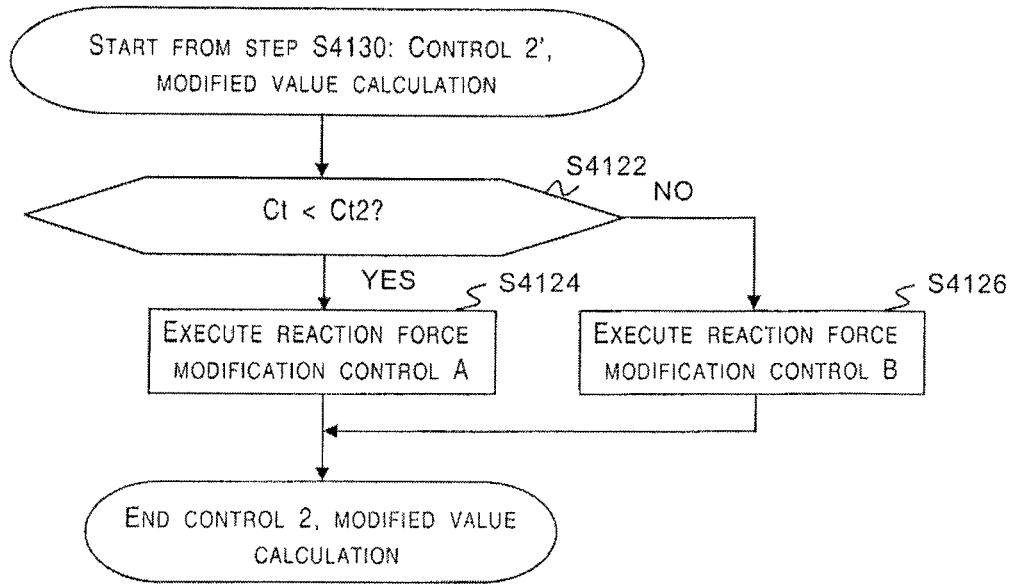
FIG. 38 is a flowchart for explaining the processing steps executed in order to calculate a modified reaction force in accordance with a control 2' of the present invention.

In step S4130, the controller 210 sets the control content of a control 2' to be executed during the RP conveyance deceleration state. When the system changes from the override standby state to the RP conveyance deceleration state, the controller 210 starts executing reaction force modification control. The processing executed in order to set the control content of the control 2' will now be explained with reference to the flowchart of FIG. 38. In step S4122, then the controller 210 determines if the value of the execution time counter Ct is smaller than a prescribed value Ct2. If so (Yes), then the controller 210 proceeds to step S4124 and calculates the modified command value Fmodified in accordance with the reaction force modification control A. The modified command value Fmodified is calculated using the aforementioned Equation 12. The modification coefficient Cfm of Equation 12 is set to, for example, 0.5.

If in step S4122 the controller 210 determines that the value of the execution time counter Ct is equal to or larger than the prescribed value Ct2, the controller 210 proceeds to step S4126 and calculates the modified command value Fmodified in accordance with the reaction force modification control B. The modified command value Fmodified is calculated using the aforementioned Equations 13 and 14. The modification coefficient Cfm_increase for when the reaction force command value FA is increasing is set to, for example, 0.7 and the modification coefficient Cfm_decrease for when the reaction force command value FA is decreasing is set to, for example, 0.4.

Additionally, the indicator lamp for following distance control and the indicator lamp for RP conveyance control are flashed, and an alarm sound (e.g., a "beep" sound) is emitted from the alarm sound device immediately after the controller 210 switches to the control 2'. The accelerator pedal 71 is also vibrated. The period and amplitude of the vibration are set in advance to appropriate values that enable the driver to recognize that the accelerator pedal 71 is vibrating.

Figure 39:
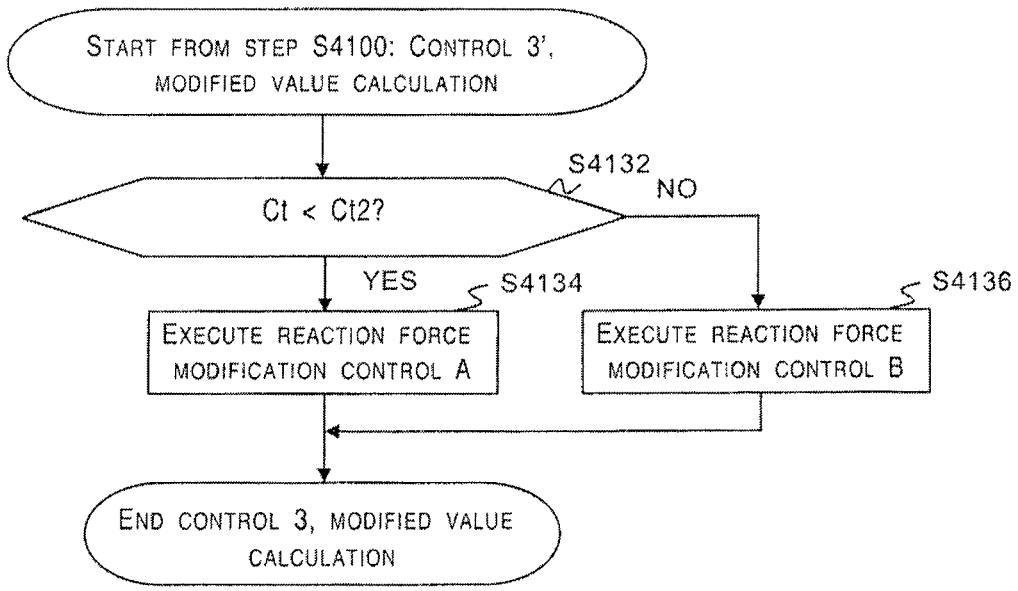
FIG. 39 is a flowchart for explaining the processing steps executed in order to calculate a modified reaction force in accordance with a control 3' of the present invention.

In step S4100, the controller 210 sets the control content of a control 3' to be executed during the RP conveyance acceleration state. The processing executed in order to set the control content of the control 3' will now be explained with reference to the flowchart of FIG. 39. In step S4132, the controller 210 determines if the value of the execution time counter Ct is smaller than a prescribed value Ct2. If so (Yes), the controller 210 proceeds to step S4134 and calculates the modified command value Fmodified in accordance with the reaction force modification control A. The modified command value Fmodified is calculated using the aforementioned Equation 12. The modification coefficient Cfm of Equation 12 is set to, for example, 0.5.

If in step S4132 the controller 210 determines that the value of the execution time counter Ct is equal to or larger than the prescribed value Ct2, then the controller 210 proceeds to step S4136 and calculates the modified command value Fmodified in accordance with the reaction force modification control B. The modified command value Fmodified is calculated using the aforementioned Equations 13 and 14. The modification coefficient Cfm_increase for when the reaction force command value FA is increasing is set to, for example, 0.7 and the modification coefficient Cfm_decrease for when the reaction force command value FA is decreasing is set to, for example, 0.5.

Additionally, the indicator lamp for following distance control is turned off, the indicator lamp for RP conveyance control is flashed, and the accelerator pedal 71 is vibrated. The period and amplitude of the vibration are set in advance to appropriate values that enable the driver to recognize that the accelerator pedal 71 is vibrating.

After the content of the reaction force modification control is determined based on the state of the system, the controller 210 proceeds to step S4140. If it determines in step S4060 that the execution conditions for reaction force modification control have not been satisfied, then the controller 210 proceeds to step S4110 and enters the cancellation phase of the acceleration pedal reaction force modification control.

In step S4140, the controller 210 sends the modified reaction force command value Fmodified set by the control 1' of step S4120, the control 2' of step S4130, the control 3' of the step S4100, or the cancellation phase of step S4100 to the accelerator pedal reaction force control device 70.

In step S4150, the controller 210 sends commands to the information presentation controller 510 in accordance with the control content of the control 1', control 2', control 3', or cancellation phase. The information presentation controller 510 controls the information presenting device 520, the alarm sound issuing device 530, and the pedal vibrator 580 based on the commands from the controller 210 and, thereby, causes visual information, sound information, and a pedal vibration or click to be issued in accordance with the set control content.

In step S4160, the controller 210 calculates a target deceleration rate (deceleration rate command value) to be used during RP conveyance control. Similarly to the first embodiment, the method of calculating the target deceleration rate is adjusted such that the driver does not does not experience a feeling that something is odd about the vehicle behavior when the following distance control is overridden. In step S4170, the controller 210 sends the deceleration rate command value calculated in step S4160 to the engine controller 50 and the brake controller 60. After the command values are sent, the current cycle of the control loop ends.

The seventh embodiment just described can provide the following operational effects in addition to the effects provided by the first to sixth embodiments.

When it detects a transition from a state in which the following distance control was operating to a state in which the RP conveyance control is operating, the controller 210 modifies the braking/driving force controlled by the RP conveyance control in addition to modifying the actuation reaction force. As a result, the system can shift smoothly to RP conveyance control even when the RP conveyance control is contrived to convey the risk potential RP via both the actuation reaction force and the braking/driving force.

Eighth Embodiment

A vehicle driving assist system in accordance with an eighth embodiment of the present invention will now be explained. The basic constituent features of a vehicle driving assist system in accordance with the eighth embodiment are the same as those of the fourth embodiment shown in FIG. 18. The eighth embodiment will be explained chiefly by describing its differences with respect to the fourth embodiment.

In the previously described fourth embodiment, when the driver depresses the accelerator pedal 71 during following distance control, a reaction force modification control is executed so as to generate an actuation reaction force in the accelerator pedal 71 before the system switches to RP conveyance control. During the reaction force modification control, a modified reaction force command value Fmodified is calculated by limiting the reaction force command value FA calculated based on the risk potential RP. In the eighth embodiment, substantially the same effect is obtained by modifying the risk potential RP.

Figure 40:
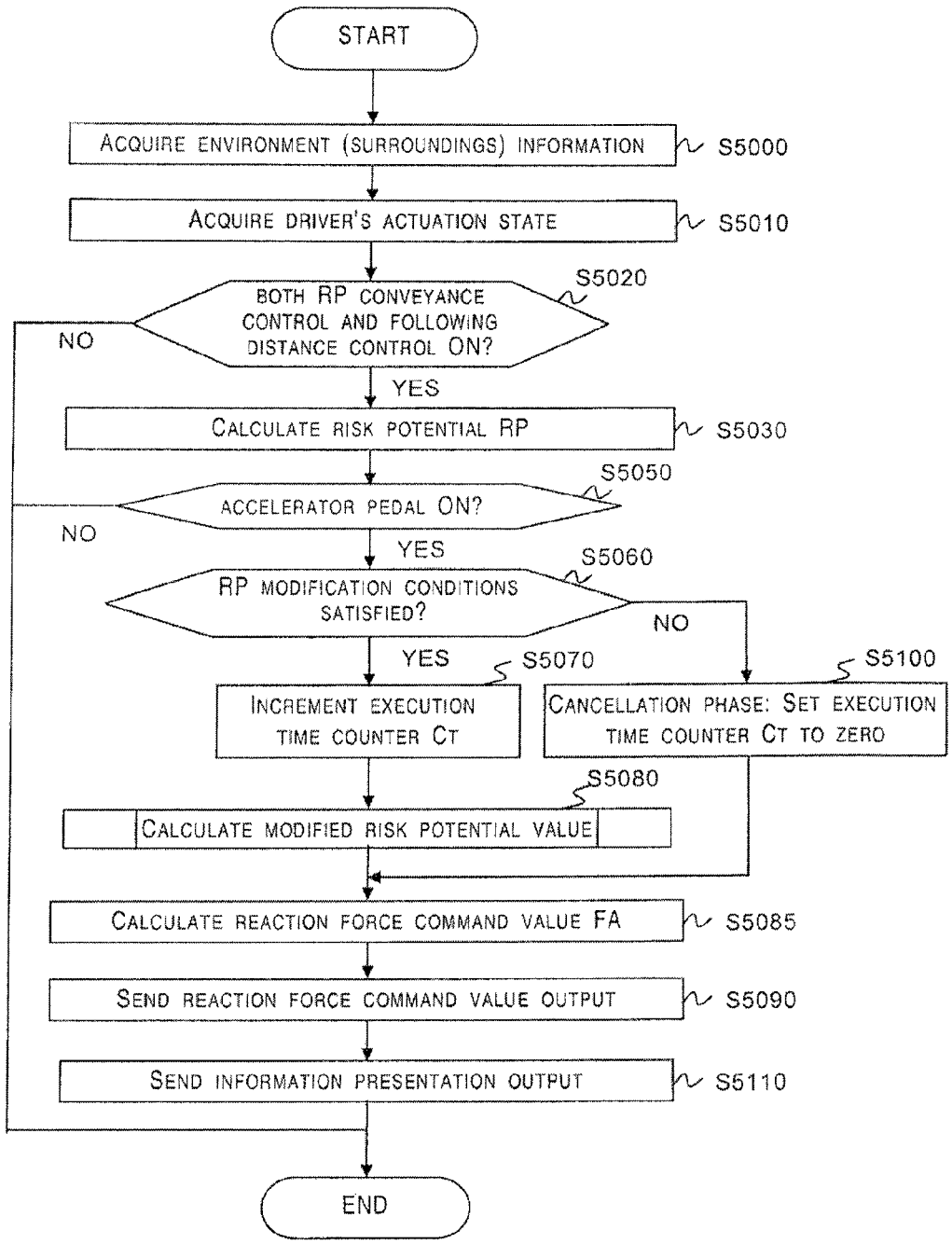
FIG. 40 is a flowchart showing the processing steps of a vehicle driving assistance control program in accordance with the eighth embodiment of the present invention.

The operation of a vehicle driving assist system 2 in accordance with the eighth embodiment will now be explained with reference to FIG. 40. FIG. 40 is a flowchart showing a portion of the processing steps of a driving assistance program executed by the controller 200. More specifically, the flowchart of FIG. 37 shows the control steps executed when the following distance control is overridden and the vehicle driving assist system 3 switches to RP conveyance control. This control loop is executed continuously once per prescribed time period, e.g., every 50 msec. The processing of the steps S5000 to S5050 is the same as in the steps S1000 to S1050 of the flowchart shown in FIG. 20 and explanations of these steps are omitted for the sake of brevity. However, a calculation of the accelerator pedal actuation reaction force command value FA corresponding to step S1040 is not included in this embodiment.

In step S5060, the controller 200 determines if it should modify the risk potential RP. A control for modifying the risk potential RP is executed if the following execution conditions are satisfied: (1) the same preceding vehicle is detected as the preceding obstacle and (2) the value of an execution time counter Ct is equal to or smaller than a prescribed amount of time Ct1. If the conditions for executing accelerator pedal reaction force modification control are satisfied, then the controller 200 proceeds to step S5070 and increments the execution time counter Ct.

Figure 41:
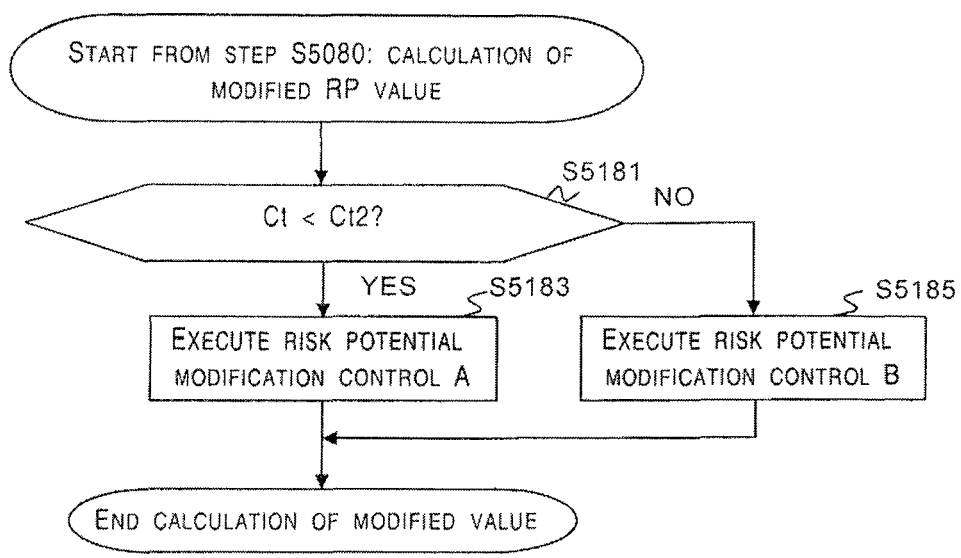
FIG. 41 is a flowchart for showing the processing steps executed in order to calculate a modified risk potential value.

In step S5080, the controller 200 executes control processing for modifying the risk potential. The risk potential modification executed includes a risk potential modification control (hereinafter called "risk potential modification control A") executed after the accelerator pedal 71 starts being depressed and a risk potential modification control (hereinafter called "risk potential modification control B") executed as a transition from the risk potential modification control A to the normal RP conveyance control based on the risk potential RP. The control processing executed in order to modify the risk potential RP will now be explained with reference to the flowchart of FIG. 41.

In step S5181, the controller 200 compares the value of the execution time counter Ct to a prescribed amount of time Ct2. If the value of the execution time counter Ct is smaller than the prescribed amount of time Ct2, then the controller 200 proceeds to step S5183 and calculates a modified risk potential value RPmodified to be used for the risk potential modification control A. The risk potential modification control A serves to limit the risk potential RP calculated based on the running condition and traveling environment of the vehicle for the duration of the prescribed amount of time Ct2. For example, as shown in Equation 16 below, the modified value RPmodified can be calculated as one half the risk potential RP calculated in step S5030.

$$RPmodified = \tfrac{1}{2} \times RP = \tfrac{1}{2}\{A/THW + B/TTC\} \quad \text{(Equation 16)}$$

If it determines in step S5181 that the value of the execution time counter Ct is equal to or larger than the prescribed amount of time Ct2, then the controller 200 proceeds to step S5185 and calculates a modified risk potential value RPmodified to be used for the risk potential modification control B. More specifically, when the prescribed amount of time Ct2 elapses and the system 2 shifts to the risk potential modification control B, the modified risk potential value RPmodified is gradually returned from one half of the risk potential RP to the full risk potential RP. The risk potential modification control B ends when the modified value RPmodified equals the risk potential RP (RPmodified=RP).

After the controller 200 calculates the modified risk potential RP in step S5080, the controller 200 proceeds to step S5085. Meanwhile, if it determines in step S5060 that the execution conditions for risk potential modification control are not satisfied, then the controller 200 proceeds to step S5100. Also, when the risk potential modification control B ends, the result of step S5060 will be negative and the controller 200 will proceed to step S5100 because the execution time counter Ct will have exceeded the prescribed time Ct1. In step S5100, the controller 200 shifts to a cancellation phase of the risk potential modification control. The controller 200 resets the execution time counter Ct to 0 and sets the modified reaction force command value RPmodified to the risk potential RP calculated in step S5030 as is (i.e., without modification).

In step S5085, the controller 200 uses the risk potential modification value RPmodified calculated in step S5080 or S5100 to calculate the accelerator pedal reaction force command value FA. Similarly to the fourth embodiment, the accelerator pedal reaction force command value FA is set to be, for example, proportional to the modified risk potential value RPmodified.

In step S5090, the controller 200 sends the reaction force control command value FA calculated in step S5085 to the accelerator pedal reaction force control device 70. In step S5110, the controller 200 presents information indicating the operating states of the RP conveyance control and the following distance control. More specifically, for example, if the risk potential modification control A is being executed, the controller 200 illuminates the indicator lamp for following distance control and flashes the indicator lamp for RP conveyance control. If the risk potential modification control B is being executed, then the controller 200 illuminates the indicator lamp for following distance control and flashes the indicator lamp for RP conveyance control slowly. If the risk potential modification control is in the cancellation phase, then the controller 200 flashes the indicator lamp for following distance control slowly and illuminates the indicator lamp for RP conveyance control. It is also possible to issue sound information and/or vibrate the accelerator pedal 71. After the command values are sent, the current cycle of the control loop ends.

In the first to third embodiments, the risk potential RP is calculated as the repulsive forces of two imaginary elastic bodies correlated to the time to headway THW and the time to collision TTC of the vehicle with respect to a preceding obstacle. However, the invention is not limited to this method of calculating the risk potential RP. It is also possible to calculate the risk potential RP as the repulsive force of only one imaginary elastic body correlated to either the time to headway THW or the time to collision TTC. Still other feasible ideas include adding a function of the inverse of the time to headway THW to a function of the inverse of the time to collision TTC and using the result as the risk potential RP or selecting the larger of the two functions as the risk potential RP.

The relationship between the risk potential RP and the reaction force command value FA is not limited to that shown in FIG. 11. It is possible to contrive the relationship such that the reaction force command value FA increases as the risk potential RP increases. In the first to eighth embodiments, the accelerator pedal actuation reaction force control is executed based on the risk potential RP. The accelerator pedal 71 is the driving operation device operated by the driver in order to drive the vehicle and the risk potential RP can be conveyed to the driver in a continuous manner through the actuation reaction force. It is also acceptable to use the brake pedal or the steering wheel as the driver-operated driving operation device and control the actuation reaction force exerted by the brake pedal or steering wheel based on the risk potential RP.

In the first to third embodiments, the RP conveyance control comprises an actuation reaction force control contrived to control the actuation reaction force of a driver-operated driving operation device based on the risk potential RP and a braking/driving force control contrived to impose a target deceleration rate. However, the invention is not limited to such a configuration and it is also possible to contrive the RP conveyance control to comprise only a braking/driving force control executed based on the risk potential RP. It is also possible for the RP conveyance control to involve only a driving force control and not a braking force control.

In the first to eight embodiments described heretofore, the laser radar 10, the vehicle speed sensor 20, and the frontward camera 30 can function as an obstacle detecting section. The risk potential calculating unit 151 and the controller 200 or 210 can function as a risk potential calculating section. The first target deceleration rate calculating unit 153, the accelerator pedal reaction force control device 70, the engine controller 50, the brake actuator 60, and the controller 200 or 210 can function as a first driving assistance control system. The second target deceleration rate calculating unit 154, the engine controller 50, the brake actuator 60, and the controller 200 or 210 can function as the second driving assistance control system. The accelerator pedal stroke sensor 90, the steering switch unit 100, and the controller 150, 200, or 210 can function as the transition detecting section. The modified target deceleration rate calculating unit 155 and the controller 200 or 210 can function as the control adjusting section. The accelerator pedal stroke sensor 90 can function as the accelerator pedal actuation amount detecting section and the transition preparation detecting section. The accelerator pedal stroke sensor 90 and the controller 150, 200, or 210 can function as the accelerator pedal depression rate detecting section. However, the invention is not limited to using these specific devices. For example, a milliwave radar of a different format can be used as the obstacle detecting section. It is also possible to use only the engine controller 50 and the brake actuator 60 as the braking/driving force control means or to use an entirely different means of decelerating the vehicle. In short, the explanations presented heretofore are merely examples. When interpreting the present invention, the invention should not be limited or restrained in any way by the corresponding relationships between the embodiments and the claims.

Thus, while only selected embodiments have been chosen to illustrate the present invention, it will be apparent to those skilled in the art from this disclosure that various changes and modifications can be made herein without departing from the scope of the invention as defined in the appended claims. The functions of one element can be performed by two, and vice versa. The structures and functions of one embodiment can be adopted in another embodiment. It is not necessary for all advantages to be present in a particular embodiment at the same time. Thus, the foregoing descriptions of the embodiments according to the present invention are provided for illustration only, and not for the purpose of limiting the invention as defined by the appended claims and their equivalents.

What is claimed is:

1. A vehicle driving assist system comprising:
   a preceding object detecting section configured to detect a preceding object existing in front of a host vehicle;
   a risk potential calculating section configured to calculate a risk potential indicative of a degree of convergence between the host vehicle and the preceding object based on a detection result of the preceding object detecting section;
   a first driving assistance control system configured to control at least one of an actuation reaction force exerted by a driver-operated driving operation device and a braking/driving force exerted against the host vehicle based on the risk potential calculated by the risk potential calculating section;
   a second driving assistance control system configured to control the braking/driving force of the host vehicle such that a headway distance is maintained between the host vehicle and the preceding object;
   a transition detecting section configured to detect a transition of operating states between the first and second driving assistance control systems; and
   a control adjusting section configured to adjust at least one of the braking/driving force and the actuation reaction force during transition between the first and second driving assistance control systems,
   the control adjusting section being configured to give priority to the control executed by the second driving assistance control system over the control executed by the first driving assistance control system while both the first and second driving assistance control systems are in an operable state,
   the control adjusting section being further configured to execute the control of the first driving assistance control system while both the first and second driving assistance control systems are in the operable state and while an accelerator pedal is depressed by a driver.

2. The vehicle driving assist system as recited in claim 1, wherein
   the operating states of the first and second driving assistance control systems are changed based on operation of at least one driver operable switching device.

3. The vehicle driving assist system as recited in claim 1, further comprising
   a transition preparation detecting section configured to detect a preparation state occurring before changing from a state in which the second driving assistance control system was operating to a state in which the first driving assistance control system is operating,
   the control adjusting section being configured to limit the control executed by the first driving assistance control system when the transition preparation detecting section detects the preparation state.

* * * * *